US011070138B2

(12) United States Patent
Dutta et al.

(10) Patent No.: US 11,070,138 B2
(45) Date of Patent: *Jul. 20, 2021

(54) SYSTEM FOR CONTROLLING A DIRECT-CURRENT-TO-DIRECT-CURRENT CONVERTER TO PROVIDE ELECTRICAL ENERGY TO A VEHICLE IMPLEMENT

(71) Applicant: Deere & Company, Moline, IL (US)

(72) Inventors: Sumit Dutta, Fargo, ND (US); Long Wu, Fargo, ND (US); Shuvam Gupta, Wauwatosa, WI (US); David M. Loken, West Fargo, ND (US); Eric R. Linn, Klindred, ND (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,140

(22) Filed: Apr. 24, 2020

(65) Prior Publication Data

US 2021/0135584 A1 May 6, 2021

Related U.S. Application Data

(63) Continuation-in-part of application No. 16/669,691, filed on Oct. 31, 2019.

(51) Int. Cl.
*H02M 3/335* (2006.01)
*H02K 7/00* (2006.01)
(Continued)

(52) U.S. Cl.
CPC ........ *H02M 3/33584* (2013.01); *B60W 20/00* (2013.01); *H02K 7/006* (2013.01);
(Continued)

(58) Field of Classification Search
CPC ..... B60L 50/10; B60L 2210/10; B60W 20/00; H02K 7/006; H02M 2001/0006;
(Continued)

(56) References Cited

U.S. PATENT DOCUMENTS 6,067,237 A * 5/2000 Nguyen ............ H02M 3/33584
363/132
6,809,678 B2 10/2004 Vera et al.
(Continued)

FOREIGN PATENT DOCUMENTS

| EP | 1995108 A1 | 11/2008 |
| EP | 2200167 A2 | 6/2010 |
| EP | 2966764 A1 | 1/2016 |

OTHER PUBLICATIONS

U.S. Appl. No. 16/669,691, filed Oct. 31, 2019.
(Continued)

*Primary Examiner* — Yusef A Ahmed

(57) ABSTRACT

Each one of the secondary converters has a corresponding transformer having a primary winding associated with a primary alternating current (AC) signal and a secondary winding associated with a secondary alternating current (AC) signal. A secondary controller provides secondary control signals to the secondary semiconductor switches of the secondary converters with one or more time-synchronized, target phase offsets with respect to an observed phase of the alternating current signal (e.g., primary alternating current signal or the secondary alternating current signal) to provide the target phase offset (or targeted phase offsets) commensurate with or sufficient to support a required electrical energy transfer from the primary controller to the corresponding secondary controller (or secondary controllers).

21 Claims, 10 Drawing Sheets

(51) Int. Cl.
*B60W 20/00* (2016.01)
*H02M 1/00* (2006.01)

(52) U.S. Cl.
CPC ..... *H02M 3/33592* (2013.01); *B60L 2210/10* (2013.01); *H02M 2001/0006* (2013.01); *H02M 2001/007* (2013.01)

(58) Field of Classification Search
CPC ...... H02M 2001/007; A01C 7/00; A01C 7/08; A01C 19/00
See application file for complete search history.

(56) References Cited

U.S. PATENT DOCUMENTS

| | | | |
|---|---|---|---|
| 7,149,097 | B1 | 12/2006 | Shteynberg et al. |
| 7,990,098 | B2* | 8/2011 | Perisic .................. B60L 50/61 318/801 |
| 8,355,265 | B2 | 1/2013 | Gengenbach |
| 8,780,585 | B2 | 7/2014 | Ye |
| 10,050,534 | B1* | 8/2018 | Murthy-Bellur ........ H02M 3/24 |
| 10,263,456 | B1* | 4/2019 | Wang ............... H02M 3/33584 |
| 10,804,809 | B1* | 10/2020 | Yelaverthi ............ H02J 7/0018 |
| 2009/0251925 | A1 | 10/2009 | Usui et al. |
| 2010/0308559 | A1* | 12/2010 | Tarasinski ............ A01B 59/00 280/422 |
| 2011/0181104 | A1* | 7/2011 | Kamaga ................. B60L 50/61 307/9.1 |
| 2011/0215743 | A1* | 9/2011 | Fukatsu ................. B60L 53/24 318/139 |
| 2011/0254379 | A1* | 10/2011 | Madawala .............. H02J 5/005 307/104 |
| 2013/0272036 | A1 | 10/2013 | Fang |
| 2014/0334189 | A1 | 11/2014 | Yan et al. |
| 2015/0180350 | A1* | 6/2015 | Huang .................... H02J 9/06 307/66 |
| 2015/0210173 | A1* | 7/2015 | Funabashi ............... B60L 1/006 307/10.1 |
| 2015/0229225 | A1* | 8/2015 | Jang ................. H02M 3/33569 363/17 |
| 2015/0375633 | A1* | 12/2015 | Masuda ................ B60L 15/007 320/109 |
| 2016/0254756 | A1* | 9/2016 | Yang ....................... H01F 27/24 363/21.02 |
| 2016/0268916 | A1* | 9/2016 | Ramsay ................. H04W 72/04 |
| 2017/0005584 | A1* | 1/2017 | Guepratte ......... H02M 3/33561 |
| 2017/0324319 | A1 | 11/2017 | Mok et al. |
| 2019/0190393 | A1* | 6/2019 | Murakami ........ H02M 3/33561 |
| 2019/0379291 | A1* | 12/2019 | Xue ......................... H02M 7/219 |
| 2019/0379292 | A1* | 12/2019 | Fei ........................... H01F 27/24 |
| 2020/0014306 | A1* | 1/2020 | Riar .................. H02M 3/33584 |
| 2020/0212815 | A1* | 7/2020 | Yamasaki ............... H02J 7/007 |
| 2020/0259337 | A1* | 8/2020 | DeCock ................ H02M 7/493 |
| 2020/0389095 | A1* | 12/2020 | Kajiyama ............. H02M 3/156 |
| 2020/0412238 | A1* | 12/2020 | Zhu ................... H02M 3/33569 |
| 2021/0021224 | A1* | 1/2021 | Niimura .................. H02M 7/49 |
| 2021/0067048 | A1* | 3/2021 | Zhang ................... H02M 3/335 |

OTHER PUBLICATIONS

Basile, Bart and Manish Bhardwaj. "TI Designs: TIDA-010039 Three-Level, Three-Phase SiC AC-to-DC Converter Reference Design." Texas Instruments [online], Nov. 2018 [retrieved on Jul. 15, 2020]. Retrieved from the Internet: <https://www.ti.com/lit/ug/tiduej5.pdf?ts=1608643867256&ref_url=https%253A%252F%252F.
Corradini, L., E. Tedeschi, and P. Mattavelli. "Advantages of the symmetric-on time modulator in multiple-sampled digitally controlled DC-DC converters." In 2007 IEEE Power Electronics Specialists Conference, pp. 1974-1980. IEEE, 2007.
Xu, Jin; Matthew Armstrong, and Maher Al-Greer. "Parameter Estimation of DC-DC Converters Using Recursive Algorithms with Adjustable Iteration Frequency." In 2018 IEEE 19th Workshop on Control and Modeling for Power Electronics (COMPEL), pp. 1-8. IEEE, 2018.
European Search Report issued in counterpart application No. 20202958.3 dated Mar. 15, 2021 (09 pages).
European Search Report issued in counterpart application No. 20202962.5 dated Mar. 23, 2021 (11 pages).
Himanshu Mishra and Amit Kumar Jain, Single Current Sensor Based Vector Control of AC/DC Front End Converter, pp. 1-5, IEEE, 2014.

* cited by examiner

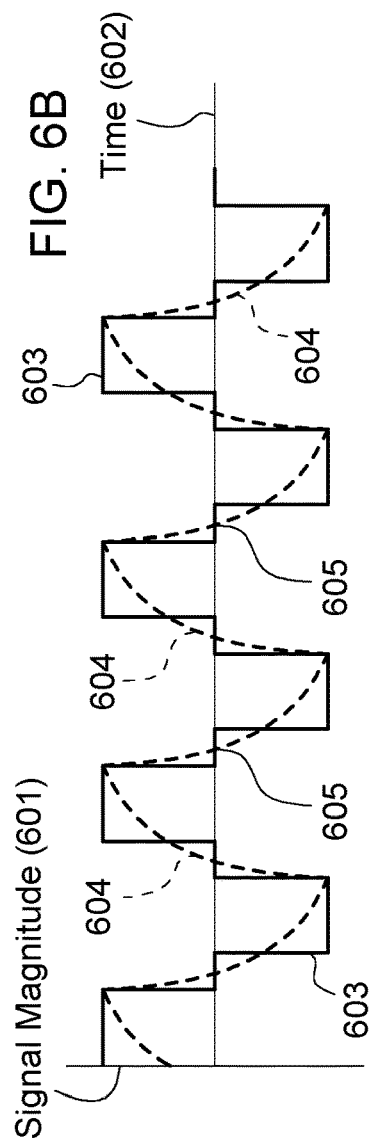
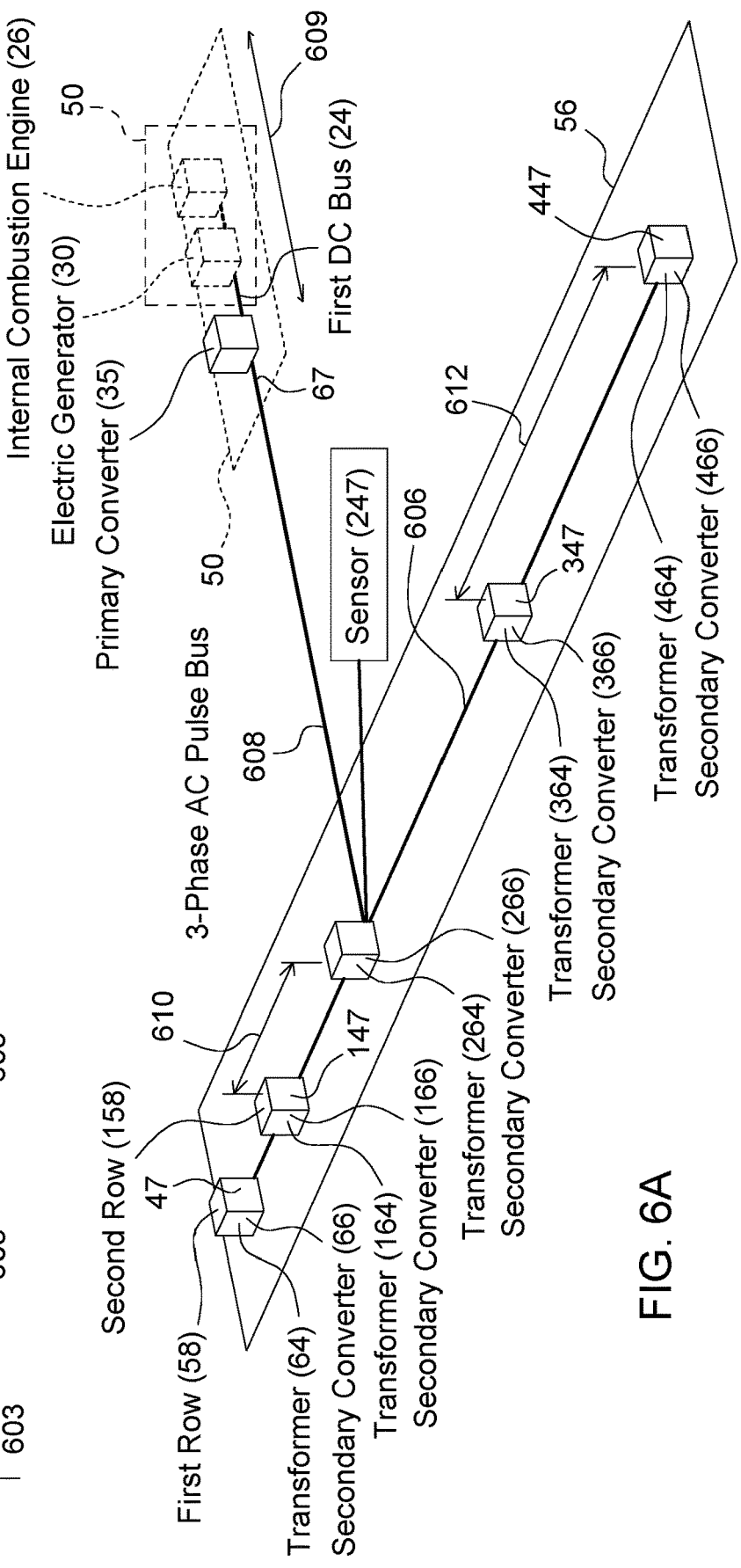

SYSTEM FOR CONTROLLING A DIRECT-CURRENT-TO-DIRECT-CURRENT CONVERTER TO PROVIDE ELECTRICAL ENERGY TO A VEHICLE IMPLEMENT

RELATED APPLICATION

This is a continuation-in-part of U.S. application Ser. No. 16/669,691, filed on Oct. 31, 2019, which is hereby incorporated by reference it its entirety into this document, and this document claims priority based on the above-referenced U.S. application.

DISCLOSURE

This disclosure relates to system for controlling a direct-current to direct-current converter to provide electrical energy to a vehicle implement.

BACKGROUND

An off-road vehicle may be associated with vehicle implements that perform work tasks, such as agriculture, construction, mining, road repair and maintenance work tasks. The vehicle implement may control a source of rotational energy to adjust or move components of the implement to perform one or more work tasks. In certain prior art, the vehicle has an internal combustion engine that drives a generator to produce a direct current (DC) vehicle bus. In some prior art, a direct-current-to-direct-current-converter supports the conversion of the DC vehicle bus to a different voltage level at an auxiliary DC bus for one or more corresponding loads connected to the vehicle or inside its cab. Accordingly, there is a need for efficiently controlling a direct-current to direct-current converter in a vehicle-implement configuration.

SUMMARY

In accordance with one embodiment, a system for controlling a direct-current-to-direct-current converter comprises a primary converter and one or more secondary converters. The primary converter has primary semiconductor switches. A primary controller provides control signals to the primary semiconductor switches. One or more secondary converters are coupled in parallel at the alternating current (AC) terminals of the primary converter via a set of conductors. Each secondary converter has secondary semiconductor switches.

Each one of the secondary converters has a corresponding transformer. The transformer comprises a primary winding or primary terminal associated with (or in electrical communication with) a primary alternating current (AC) signal of the primary converter. The transformer comprises a secondary winding or secondary terminal associated with a secondary alternating current (AC) signal of a corresponding one of the secondary converters. One or more secondary controllers provide secondary control signals to the secondary semiconductor switches of the secondary converters with one or more time-synchronized, target phase offsets with respect to an observed phase (e.g., sampled phase measurements) of the alternating current signal. For example, the target phase offsets (or targeted phase offsets) are set or adjusted to be commensurate with or sufficient to support a required electrical energy transfer from the primary converter to the corresponding secondary converter (or secondary converters).

BRIEF DESCRIPTION OF THE DRAWINGS

FIG. 6A is an illustrative block diagram of a primary converter that is coupled to multiple secondary converters, where each secondary converter is associated a different row unit or set of row units of an implement having a transverse member.

FIG. 6B is a graph of the signal magnitude versus time of the reference signal measured at the junction node.

DETAILED DESCRIPTION

In any of the above referenced drawings of this document, any arrow or line that connects any blocks, components, modules, multiplexers, sensors, switches, semiconductors, diodes, memory, data storage, data processors, electronic components, oscillators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In one embodiment, the system disclosed in this document may comprise a computer-implemented system, method or converter in which one or more data processors process, store, retrieve, and otherwise manipulate data via data buses and one or more data storage devices (e.g., data storage device or memory) as described in this document and the accompanying drawings. As used in this document, "configured to, adapted to, or arranged to" mean that the data processor, converter or controller is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in any other drawing in this disclosure. Alternately, separately from or cumulatively with the above definition, "configured to, adapted to, or arranged to" can mean that the converter comprises one or more components described herein as software modules, equivalent electronic hardware modules, or both to execute any referenced functions, logic operations, mathematical operations, calculations, determinations, processes, methods, algorithms, subroutine.

As used herein, consistent with standard convention, any impedance (Z) is generally equal to the sum of resistance (R) plus the product of reactance (X) and imaginary component (i or j), where the impedance is associated with one or more terminals or nodes of a component, device, circuit, network, and/or transmission line, and where reactance (X) may include inductance (ωL), capacitance (1/ωC), or both. Further, such inductance or capacitance may comprise actual discrete components (e.g., discrete inductors, coils, or capacitors) or may be modeled components (e.g., virtual devices) to represent or define other circuit components, devices, networks, or transmission lines.

Figure 1:
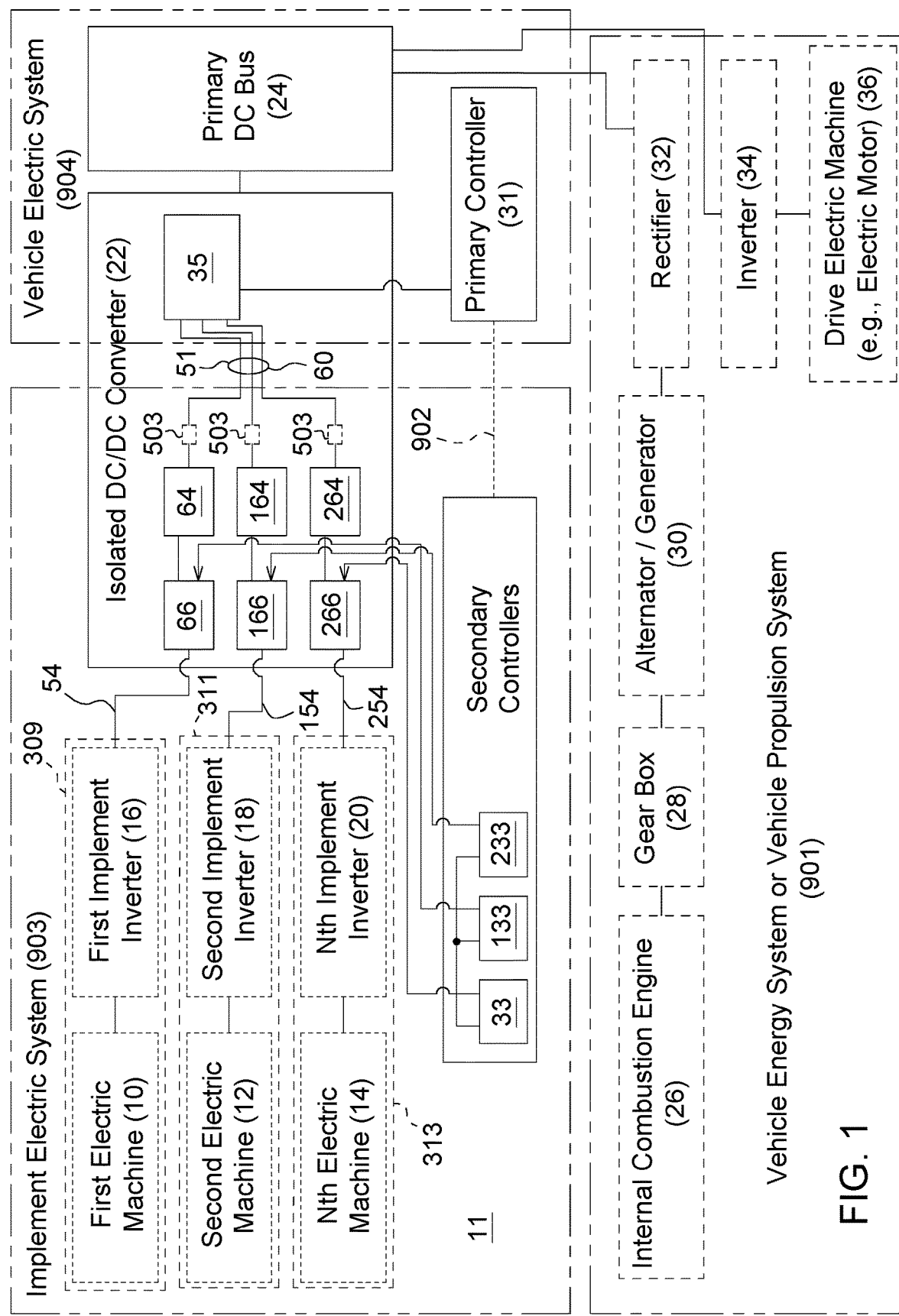
FIG. 1 is a block diagram of one embodiment of a system for controlling a direct-current to direct-current converter in the context of a hybrid vehicle.
Figure 3A:
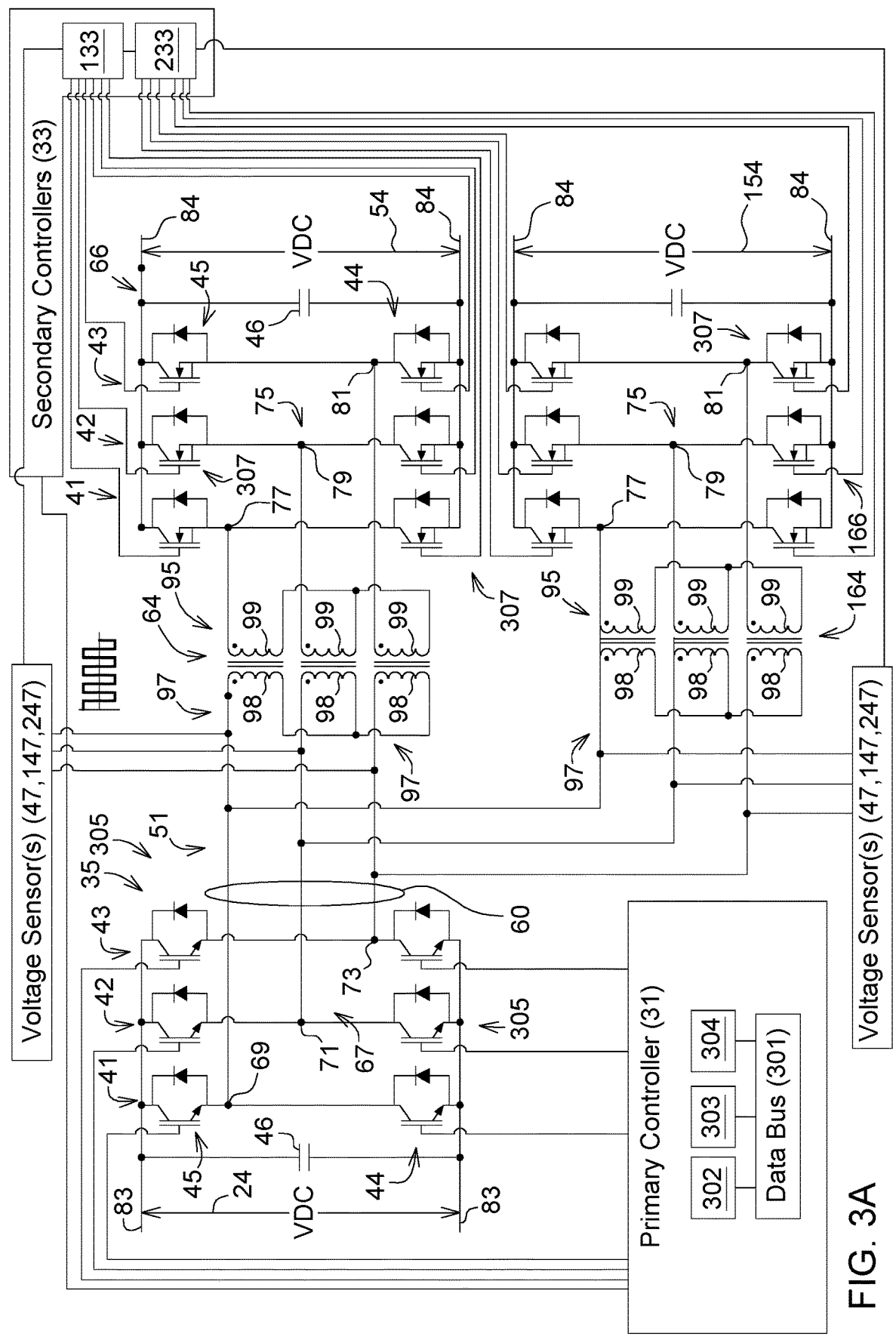
FIG. 3A is an illustrative schematic diagram of one embodiment of a system for controlling a direct-current to direct-current converter, consistent with FIG. 1 or FIG. 2.

In accordance with one embodiment of FIG. 1, a system 11 for controlling an electrically isolated, direct-current (DC)-to-direct-current (DC) converter 22 comprises a primary converter 35 and one or more secondary converters, such as a first secondary converter 66, a second secondary converter 166 and an Nth secondary converter 266, where N equals any whole number greater or equal to three. Although FIG. 1 illustrates the system 11 where N equals three, virtually any number of secondary converters (66, 166, 266) may be used provided that the primary converter 35 can provide enough current to drive the secondary converters (66, 166, 266). The primary converter 35 has primary semiconductor switches, such as low-side switches 44 and high-side switches 45, as illustrated in FIG. 3A. A primary controller 31 provides control signals to the primary semiconductor switches in the primary converter 35.

Class A DC voltage generally means 6 VDC to 48 VDC, for example. Class B DC voltage generally means 60 (Volts direct current) VDC to 1,500 VDC. Similarly, Class B AC voltage generally means 30 (Volts alternating current or root-mean squared alternating current) VAC to 1000 VAC. The primary converter 35 provides an alternating current (AC), generally at Class B AC voltages, on the set of conductors 51 (in FIG. 1) or AC lines 124 (in FIG. 2), where the AC voltage level is conducive or compatible with transmission of electrical energy efficiently over extended distances (e.g., that can exceed 35 meters) within the vehicle-implement configuration, where it is possible to have commercially available row planters (e.g., 48 rows) that are approximately 37 meters wide or sprayers with 40 meter boom widths.

The DC-to-DC converter can operate in a buck mode, a boost mode, or both. In the buck mode, the DC-to-DC converter decreases or steps down the voltage between the primary voltage of the primary DC bus and the secondary voltage of the secondary DC bus. In the boost mode, the DC-to-DC converter increases or steps up the voltage between the primary voltage of the primary DC bus and the secondary voltage of the secondary DC bus. In one example as illustrated in FIG. 3A, the first voltage level (e.g., 700 VDC) of the DC on the primary DC bus 24 is different (e.g., higher) than a second voltage level (e.g., 56 VDC) of one or more secondary DC buses (54, 154, 254). For instance, the voltage at the primary DC bus 24 may be higher than the voltage at the secondary DC buses (54, 154, 254) in certain configurations of the system.

In one embodiment, different ones of the secondary converters (66, 166, 266) can regulate to respective different secondary direct current (DC) output voltages associated with the target load voltages at the secondary DC buses (54, 154, 254) that are independent of the voltage of the primary DC bus 24. In another embodiment, the DC-to-DC converter 11 comprises a distributed system where the primary converter 35 on vehicle is spaced apart from each of the secondary converters (66, 166, 266) on an implement (e.g., towed implement mechanically coupled to the vehicle) where each of the secondary AC input node 75 is time-synchronized (e.g., subject to customized target phase offset) to a primary AC output 67 of the primary converter 35 by the sensors (47, 147, 247) that measure the observed reference phase associated with the primary terminals 97 or secondary terminals 95 of the transformer or transformers (64, 164, 264). Some implements, such as planters or sprayers may position the secondary converters (66, 166, 266) and their associated loads (e.g., electric machines) along a transverse member, such as sprayer boom, or row units, where the primary converter to the secondary converters (66, 166, 266) via transmission lines that carry alternating current (AC) provides electrical energy to the secondary converters (66, 166, 266) via transmission lines that carry alternating current (AC).

In accordance with one embodiment, a system 11 for controlling a direct-current-to-direct-current converter 22 comprises a primary converter 35 and one or more secondary converters (66, 166, 266). The primary converter 35 has primary semiconductor switches. A primary controller 31 provides primary control signals to the primary semiconductor switches. One or more secondary converters are coupled (e.g., in parallel) to the primary converter 35 via a set of conductors 51. Each secondary converter (66, 166, 266) has secondary semiconductor switches, such as low-side switches 44 or high-side switches 45.

Figure 2:
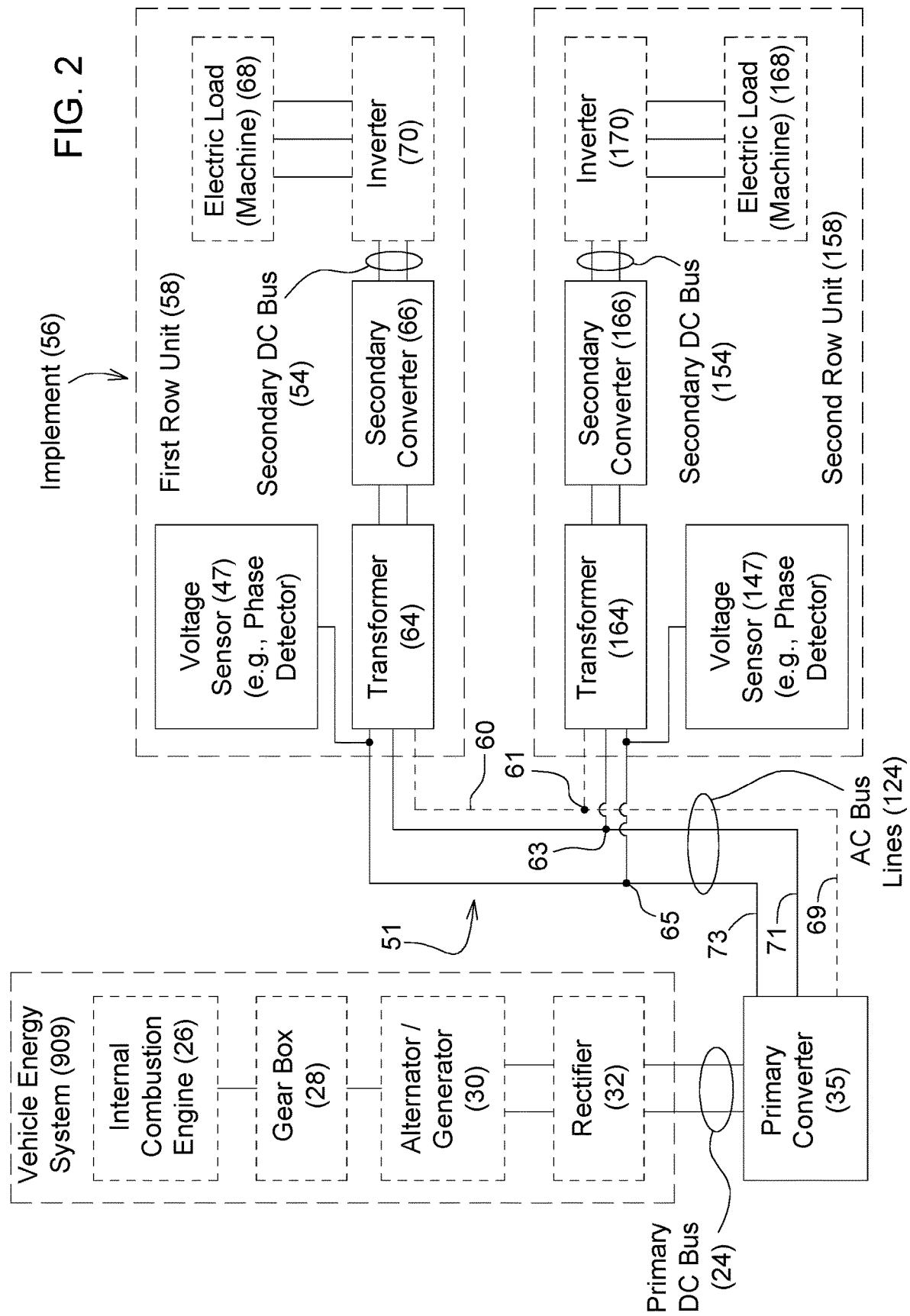
FIG. 2 is a block diagram of another embodiment of a system for controlling a direct-current to direct-current converter in the context of a hybrid vehicle.

FIG. 1 illustrates a simplification of the conductors 51 (e.g., electrical transmission lines) between the converter 35 and each transformer (64, 164, 264), via the inductance 503. However, in practice the converter 35 has a separate set of conductors 51 for each output phase consistent with FIG. 2. In FIG. 2, the primary converter 35 has a set of output terminals that are associated with corresponding output phases (e.g., three output phases), where conductors 51 to the transformers (64, 164) are connected (e.g., in parallel) to the three corresponding output phases at one or more junction nodes 60.

In FIG. 1, the inductance 503 is shown in dashed lines because it is optional in that the inductance may be integrated with the transformer or integrated in the transformer, or the inductance 503 may comprise a discrete component or discrete inductor. As shown in FIG. 1, the primary impedance or apparent input impedance of the transformer (64, 164, 264) includes the contribution from the inductance 503. The inductance 503 can be selected or designed: (1) to adjust the apparent input impedance relative to the input impedances of the other transformers (with substantially identical specifications) in parallel (e.g., to equalize the impedance of each transformer where loads on each transformer are anticipated to be substantially equal or within a predefined tolerance, or to differ the impedance of different transformers to allocate unequal loads based on the design constraints of vehicles or implements) at the operating frequency or over the operating frequency range, and/or (2) to support greater secondary current flow ($I_s$) in the secondary, with respect to a primary current flow ($I_p$), by adjusting (e.g., increasing) the primary impedance (4) and/or using the energy storage capacity of the inductance 503. The energy storage of the inductance 503 and greater secondary current flow in the secondary and is well-suited to support power transfer or power flow from the primary converter 35 to a corresponding secondary converter (66, 166, 266), subject to the secondary controller (33, 133, 233) controlling the power flow by the target phase offset between the primary AC signal and one or more secondary AC signals.

In one configuration, for each transformer that has a single primary and a single secondary winding, the following equations theoretically define the ratio of the primary impedance to the secondary impedance:

$$Z_p/Z_s = 1/N^2; \text{ where}$$

$N=V_p/V_s$ and where $Z_p$ is the primary impedance or apparent input impedance, where $Z_s$ is the secondary impedance or output impedance, where N is the ratio of the primary winding (turns) to the secondary winding turns, where $V_p$ is the primary voltage and $V_s$ is the secondary voltage.

Figure 3B:
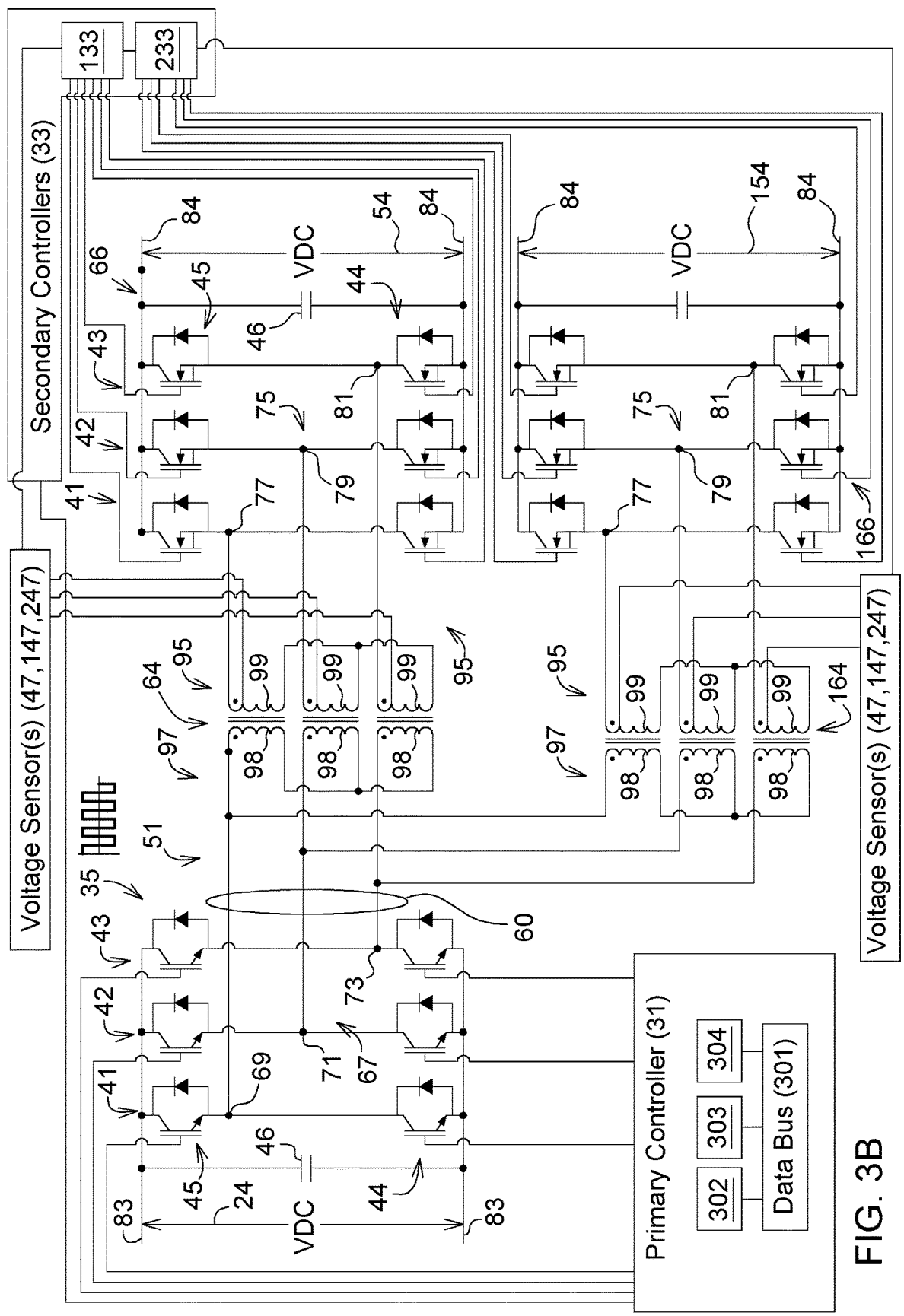
FIG. 3B is an illustrative schematic diagram of another embodiment of a system for controlling a direct-current to direct-current converter, consistent with FIG. 1 or FIG. 2.
Figure 3C:
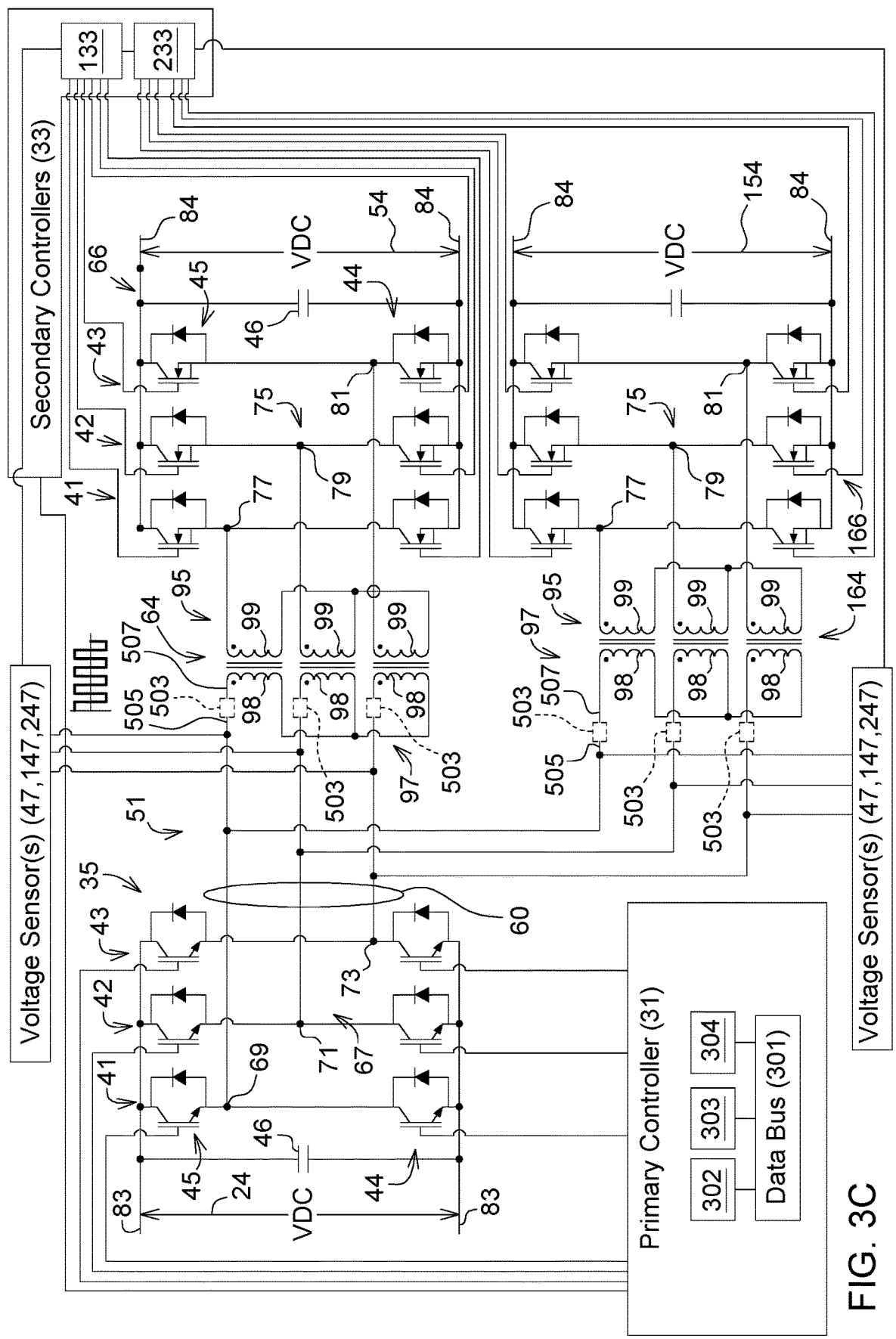
FIG. 3C is an illustrative schematic diagram of yet another embodiment of a system for controlling a direct-current to direct-current converter, consistent with FIG. 1 or FIG. 2.

In one configuration, consistent with FIG. 1 and FIG. 3C, the available or potential secondary power ($P_s$) in or associated with the secondary winding 99 may adhere to the following equation:

$P_s = I_s^2 N^2 Z'_p$, where $Z'_p$ is the primary impedance or apparent input impedance that includes the contribution of integral inductance (e.g., inductance 503 or 503') and/or mutual inductance, where $I_s$ the secondary current, where N is the ratio of the primary winding (turns) to the secondary winding turns. In the transformer (64, 164, 264), mutual inductance may be modeled as a combination of contributions from series inductance (ωLsp+ωLss) and parallel inductance (1/Lpp+1/Lps), where Lsp is the series inductance contribution of the primary winding 98; Lss is the series inductance contribution of the secondary winding 99; Lpp is the parallel inductance contribution of the primary winding 98; and Lps is the parallel inductance contribution of the secondary winding 99. Further, if there are multiple primary windings, there can be some cross-phase mutual inductance or mutual inductive coupling between the first phase, second phase and third phase of the primary windings; if there are multiple secondary windings, there can be some cross-phase mutual inducive coupling. In practice, transformer coupling losses between the primary and the secondary tend to increase with increasing frequency (e.g., proportional to ω) of an alternating current (AC) signal applied to the primary or secondary of the transformer because of core losses, such as resistive and reactive (inductive) losses, such that the above equation can be corrected or compensated by a frequency dependent loss factor or coefficient. Accordingly, when considering the contributions from mutual inductance, the power output of the secondary of the transformer will tend to be lower (with less sensitivity to changes in target phase shift) as the inductance 503 is increased, where the target phase shift, input voltage or primary voltage, output voltage or secondary voltage are held relatively constant. Further, in on illustrative example, the output power ($P_{out}$) will depend upon the target phase shift (φ) from the reference observed phase shift at the respective secondary converter in accordance with the following equations (e.g., for efficient switching event operation consistent with zero voltage turn-on switching states of the secondary switches):

$$P_{out} = \frac{V_i^2}{\omega L} d\varphi \left[ \frac{2}{3} - \frac{\varphi}{2\pi} \right],$$

where φ is between 0 and π/3 in radians, where dφ is the change in target phase shift (ω) with respect to time;

$$P_{out} = \frac{V_i^2}{\omega L} d\left[ \varphi - \frac{\varphi^2}{\pi} - \frac{\pi}{18} \right],$$

where ω is between π/3 and 2π/3 in radians, where Vi is the input voltage at the primary winding 98 or primary terminals 99 of the transformer, ωL is the inductance of inductance 503 in series with the primary terminals 99 of the transformer, $P_{out}$ is the output power associated with the secondary winding 99 of the transformer. Here, as usual, π radians represents 180 degrees, such that collectively the above equations (if the above ranges in radians are considered as absolute values) include the operating range between 90 degrees and −90 degrees target phase shift.

As illustrated in FIG. 1, the vehicle electric system 904 on the vehicle may comprise the primary converter 35, the primary controller 31 and the primary DC bus 24. The implement electric system 903 is coupled to the vehicle electric system 903 via conductors 51 that support the transmission of alternating current (AC) signals between the vehicle electric system 904 and the implement electric system 903. In one embodiment of the implement electric system 903, each one of the secondary converters (66, 166, 266) has a corresponding transformer (64, 164, 264), such as a first transformer 64, a second transformer 164, or a third transformer 264. At the primary terminals 97 (in FIG. 3A), the transformer (64, 164, 264) comprises a primary winding 98 associated with (or in electrical communication with) a primary alternating current (AC) signal of the primary converter 35. At the secondary terminals (e.g., coupled secondary AC input node 75 (in FIG. 3A) of the secondary converter), the transformer (64, 164, 264) comprises a secondary winding 99 associated with a secondary alternating current signal of a corresponding one of the secondary converters (66, 166, 266).

In certain configurations, the sensors (47, 147, 247) are associated with corresponding secondary converters (66, 166, 266) for measuring or detecting a respective observed reference phase of the corresponding alternating current signal transmitted (e.g., from the primary AC output node 67) to each one of the secondary converters (66, 166, 266), where each of the sensors (47, 147, 247) is coupled via an inductance (e.g., an actual discrete inductance 503, an integral or leakage inductance 503', or both) to the transformer (64, 164, 264) associated with its respective secondary converter. The inductance may be configured in accordance with various examples that may applied separately or cumulatively. Under a first example, the inductance comprises a discrete inductance coupled to the primary winding 98 of the respective transformer (e.g., 64, 164, 264) associated with the corresponding secondary converter (66, 166, 266). Under a second example, the inductance comprises a leakage or integral inductance of the primary winding 98 of the respective transformer (e.g., 64, 164, 264) associated with the corresponding secondary converter (66, 166, 266). Under a third example, the inductance comprises a discrete inductance coupled to the secondary winding 99 of the respective transformer (e.g., 64, 164, 264) associated with the corresponding secondary converter (66, 166, 266). Under a fourth example, the inductance comprises a leakage or integral inductance of the secondary winding 99 of the respective transformer (e.g., 64, 164, 264) associated with the corresponding secondary converter (66, 166, 266).

In FIG. 3A, an integral inductance, which is analogous to inductance 503 of FIG. 1, is integrated into a primary winding 98 of the transformer (64, 164, 264), rather than set forth as a discrete component or discrete inductor. In FIG. 3A, the voltage sensor (47, 147, 247) or phase detector is actually connected to integral inductance of the transformer (64, 164, 264).

In FIG. 3B an integral inductance, which is analogous to the inductance 503 of FIG. 1, is integrated into a secondary winding 99 of the transformer (64, 164, 264) with a tap terminal (not shown) that is separated from (e.g. isolated from) the secondary AC input nodes (77, 79, 81) by the integral inductance, rather than set forth as a discrete component or discrete inductor. In FIG. 3B, the voltage sensor (47, 147, 247) or phase detector is actually connected to the tap terminal of the transformer (64, 164, 264).

As shown in FIG. 1 in conjunction with FIG. 3C, each one of the secondary converters (66, 166, 266) has a corresponding transformer (64, 164, 264) and an optional inductance 503 (e.g., in-line or series inductance). The transformer (64, 164, 264) comprises one or more primary windings 98 or primary terminals 97 associated with (or in electrical communication with) a primary alternating current (AC) signal of the primary converter 35. The transformer (64, 164, 264) comprises one or more secondary windings 99 or secondary terminals 95 associated with a secondary alternating current (AC) signal of a corresponding one of the secondary converters (66, 166, 266). The optional inductance 503 is indicated as optional by the dashed lines in FIG. 1 and FIG. 3C.

The optional inductance 503 comprises one or more of the following inductances: (a) a parasitic inductance in or associated with any transformer (64, 164, 264), or one or more windings (98, 99) of the transformer in the DC-to-DC converter system 11, (b) a parasitic inductance in or associated with any conductors (51), transmission lines, or cabling in the system 11, and (c) an inductor (e.g., coil or wound component) electrically coupled or connected to a primary or secondary side of any transformer (64, 164, 264). In one embodiment, the inductance 503 comprises an inductor coupled to each transformer on the primary side (e.g., at primary terminals 97) of the transformer (64, 164, 264) between the transformer and the primary converter 35, where the inductance 503 supports or facilitates any of the following: (a) the accumulation of energy storage in the inductance 503, (b) compensation for (e.g., balances) the parasitic impedance in conductors 51; (c) power transfer (e.g., bi-directional power transfer) between the primary (e.g., primary winding 98) and the secondary (e.g., secondary winding 99) of the transformer (64, 164, 264).

Within the set of conductors 51 (in FIG. 1), each conductor 51 has a particular transmission line length arising from a separation, on a vehicle-implement configuration, between the primary converter 35 (e.g., AC output node) and respective secondary converter (66, 166, 266). The particular transmission line length is associated with a respective impedance (e.g., typically a combination of resistance and inductance in the context of the DC-DC inverter system 11) and a respective phase delay associated with corresponding secondary converters (66, 166, 266), where the impedance and phase delay are generally associated with the particular vehicle-implement configuration. In one example, the impedance of a corresponding conductor 51 is characterized by a respective phase delay and respective voltage drop along the particular transmission line length of the conductor 51 between the primary converter 35 and any corresponding secondary converter (66, 166, 266). In one configuration, the impedance (e.g., resistance and inductance) in the conductors 51 can make the system susceptible to inadequate or undesired power transfer between secondary converters and the primary converter, in the absence of one or more inductances 503 coupled to transformers (64, 164, 264) of the corresponding secondary converters (66, 166, 266).

A transformer (64, 164, 264) comprises a primary winding 98 and a secondary winding 99, where the primary winding 98 is associated with a primary alternating current (AC) signal of (or outputted by) the primary converter 35, where the primary AC signal has one or more output phases. A secondary winding 99 is associated with a secondary alternating current (AC) signal of each respective one of the secondary converters, where the secondary AC signal has one or more output phases. The primary winding 98 has primary terminals 97 and the secondary winding 99 has secondary terminals 95, or the secondary AC input node 75.

In an alternate embodiment, any single transformer the transformer (64, 164, 264) may have one or more primary windings and one or more secondary windings, where the one or more primary windings are coupled to the primary AC output node 67 of the primary converter 35 and where secondary windings are associated with a secondary AC input node 75 of the respective secondary converters (66, 166, 266).

In one embodiment, one or more secondary controllers (33, 133, 233) provide control signals (e.g., secondary control signals) to the semiconductor switches (e.g., secondary semiconductor switches) of the secondary converters (66, 166, 266) with one or more time-synchronized, target phase offsets (e.g., respective custom phase offset or unique phase offset tailored or suited to each corresponding secondary converter) with respect to an observed reference phase (e.g., sampled phase measurements for respective time interval) of the alternating current signal (e.g., primary alternating current signal or the secondary alternating current signal) to provide the target phase offset (or targeted phase offsets) commensurate with or sufficient to support a required electrical energy transfer from the primary converter 35 to the corresponding secondary converters (66, 166, 266).

Figure 5A:
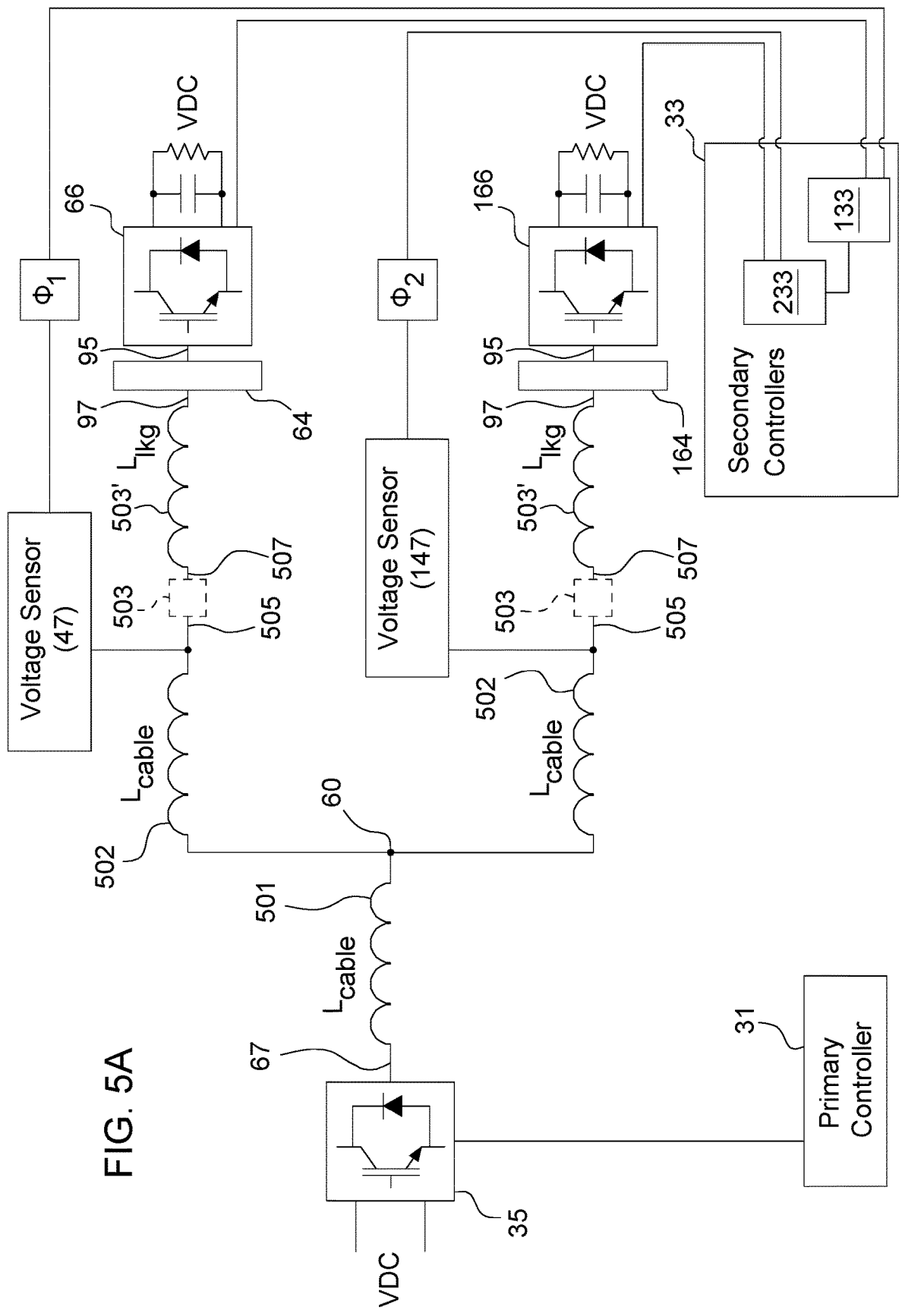
FIG. 5A is a schematic diagram of one embodiment of a DC-to-DC converter system that illustrates a potential inductance in a cable or transmission line between the primary converter and the secondary converter.

In the embodiment of FIG. 3C and in FIG. 5A, the phase detector or voltage sensor (47, 147, 247) detects or measures an observed phase (e.g., sampled phase measurements) of the alternating current (AC) signal (e.g. associated with the secondary terminals 95 or secondary AC input node terminals 75) of or applied to the secondary converter (66, 166, 266) at a first terminal 505 of an inductance 503 that is coupled (e.g., in series) to the transformer (64, 164, 264). The first terminal 505 is opposite from a second terminal 507 of the inductance 503; as illustrated in FIG. 3C, the second terminal 507 is connected to the primary winding 98 of the transformer (64, 164, 264). The phase detector or voltage sensor (47, 147, 247) may detect the observed reference phase at the primary terminals 97 or at node coupled to the primary terminals 97 or primary winding 98 of any transformer (64, 164, 264) (e.g., observed phase of the primary alternating current signal).

Figure 3D:
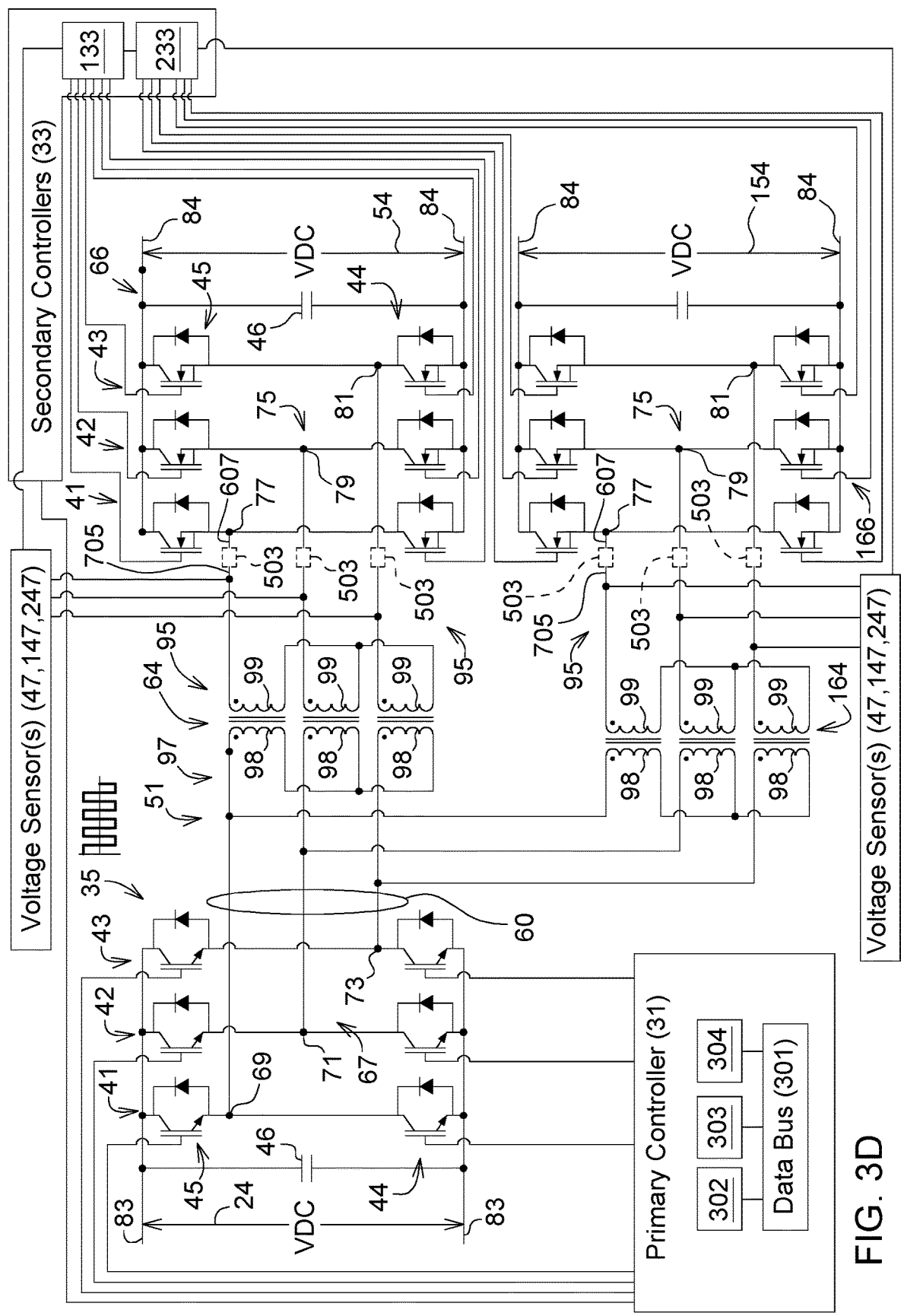
FIG. 3D is an illustrative schematic diagram of still another embodiment of a system for controlling a direct-current to direct-current converter, consistent with FIG. 1 or FIG. 2.

In the alternate embodiment of FIG. 3D, the phase detector or voltage sensor (47, 147, 247) may detect the observed reference phase; the voltage sensor (47, 147, 247) is connected at the secondary terminals 95, or at a node coupled to the secondary terminals or secondary winding 99, of any transformer (e.g., 64, 164, 264) (e.g., observed phase of the secondary alternating current signal) at a first terminal 705 of an inductance 503 that is coupled (e.g., in series) to the transformer (64, 164, 264). The phase detector or voltage sensor (47, 147, 247) is connected to a first terminal 705 of the inductance 503. The first terminal 705 is opposite from a second terminal 607 of the inductance 503; as illustrated in FIG. 3D, the second terminal 607 is connected to the secondary AC input nodes (77, 79, 81). For example, in FIG. 3D the inductance 503 supports measurement of the AC output signal of the primary converter 35 via the transformer (64, 164, 264) that is related (e.g., by network equations) to the observed reference phase at the primary winding 98, subject to an accounting of the phase delay associated with the transformer (64, 164, 264).

Each secondary controller (33, 133, 333), or its electronic data processor (analogous to data processor 302 of primary controller 31), may determine a target phase offset or target phase offsets, such as a difference between the observed reference phase and a commanded phase or controlled phase commensurate with or sufficient to support a required electrical energy transfer between (e.g., from) the primary converter 35 to the corresponding secondary converter (or secondary converters (66, 166, 266).

Within the set of conductors 51, each conductor 51 has a particular transmission line length arising from a spatial separation, on a vehicle-implement configuration, between the primary converter (e.g., AC output node) and respective ones of the secondary converters (e.g., or their transformers), as best illustrated in FIG. 6A. The particular transmission line length is associated with a respective impedance (e.g., particular aggregate impedance) or respective phase delay that is different (e.g., fixed) for each secondary converter (66, 166, 266). For example, the impedance may comprise the combination of inductance and resistance at the termination of the particular transmission line length for any conductor 51.

In one embodiment, the set of conductors 51 have associated phase shifts of the primary alternating current signal and the secondary alternating current signal. For example, the phase delays depend on or are associated with transmission line lengths and respective inductances that arise from a spatial separation between the primary converter 35 and each of the secondary converters (66, 166, 266). Each secondary converter (66, 166, 66) has secondary semiconductor switches. One or more secondary controllers (33, 133, 233) provide control signals to the secondary semiconductor switches (of one or more secondary converters) with a time-synchronized, target phase offset with respect to observed reference phase (e.g., sampled phase measurements for a respective time interval) of the primary AC signal or secondary AC signal detected by one or more sensors (47, 147, 247). For example, the target phase offsets (or phase-delay-adjusted target phase offsets for one or more corresponding secondary controllers 33, 133, 233) are selected, based on the observed reference phase (e.g., sampled phase measurements for a respective sampling interval), to provide the target phase offsets (e.g., 90 degrees phase offset from the observed reference phase) commensurate with or sufficient to support a required electrical energy transfer from the primary converter 35 to one or more of the secondary converters (66, 166, 266).

In an alternate embodiment, the primary controller 31 communicates with the secondary controller (33, 133, 233) via a transmission line (e.g., data bus), or a wireless link to provide coordinated or synchronized control signals.

In one embodiment as illustrated FIG. 1 and in FIG. 3C, each inductance 503 has a first terminal 505 (e.g., outer terminal) and a second terminal 507 (e.g., inner terminal), where the second terminal 507 is opposite the first terminal 505 that is connected to or integral with a primary terminal 97 of a primary winding 98 of the transformer (64, 164, 264). A phase detector or voltage sensor (47, 147, 247) is coupled to the first terminal 505 of the inductance 503 or integral inductance. The phase detector or voltage sensor (47, 147, 247) is configured to detect an observed reference phase measurement of a signal on one or more conductors 51 at a terminal of the transformer (64, 164, 264) with an integral inductance or at the first terminal of the inductance 503 coupled to the transformer (64, 164, 264). For example, the observed reference phase measurement or observed voltage measurement is detected through one or more of the following preparatory conditions or co-existing observation states: (1) at the first terminal 505 of the inductance that is not directly connected primary winding 98 because the secondary winding 99 can contribute to, determine or drive the voltage level across the primary winding 98; (2) when a secondary converter (66, 166, 266) coupled to a respective transformer (64, 164, 264) applies control signals to place the low-side switch 44 and high-side switch 45 for each phase that is measured in an open state such that the secondary winding 99 is floating; and/or (3) when a secondary converter (66, 166, 266) coupled to a respective transformer (64, 164, 264) applies control signals to place the low-side switch 44 and high-side switch 45 for each phase that is measured in a grounded state and an open state, respectively, such that the secondary winding is discharged (e.g., prior to floating) to ground or chassis potential.

In one embodiment, the voltage sensor (47, 147, 247) or phase detector provides the observed reference phase measurement to one or more secondary controllers (33, 133, 233). A secondary controller (33, 133, 233) is configured to generate control signals for synchronized application to the control terminals (e.g., transistor bases or gates) of the switches (44, 45), where the control signals have a target phase offset with respect to the observed reference phase for the corresponding secondary converter (66, 166, 266) based on a demanded power, power load, or commanded power of the secondary converter (66, 166, 266). The observed reference phase facilitates synchronization of the frequency of the AC signals, which include the primary AC signal and one or more secondary AC signals. Further, the observed reference phase provides a reliable phase reference from which the secondary is phase shifted with respect to.

In one configuration, as illustrated in FIG. 3A the primary controller 35 comprises an electronic data processor 302, a data storage device 303, and data ports 304 that are coupled (or connected) to a data bus 301 to support communication among and between the electronic data processor 302, the data storage device 303 and the data ports 304, which may transmit control signals to the base terminal, gate terminal or other control terminals of the semiconductor switches (44, 45) of any converter. Although FIG. 3A shows an illustrative example where the primary semiconductor switches (of the primary converter 35) comprise insulated gate-bipolar-transistor (IGBT) devices 305 and where the secondary switches (of the secondary converters 66, 166, 266) comprise metal-oxide-semiconductor field-effect-transistor (MOSFET) devices 307; IGBT, MOSFET, silicon carbide, or other semiconductor switches can be used for the primary switches, the secondary switches or both in any combination, and for one or more phases within the primary converter 35 or the secondary converter (66, 166, 266).

Similar to the block diagram of the primary controller 31 in FIG. 3A, each secondary controller (33, 133, 233) comprises an electronic data processor, a data storage device, and data ports that are coupled to a data bus to support communication among and between the electronic data processor, the data storage device and the data ports. The electronic data processor may comprise a microcontroller, a microprocessor, a logic device, a programmable logic array, a digital signal processor, an application specific integrated circuit or another data processing device. The data storage device comprises an electronic memory, nonvolatile random access memory, an optical storage device, a magnetic storage device, or another device for storing analog or digital data. The data port may comprise a communications device, a transceiver, a transmitter, data buffer memory, or another data interface for transmitting, storing and receiving data.

The electronic data processor or secondary controller (33, 133, 233) determines the target phase offset to provide the target phase offset (or targeted phase offsets to the control terminals of the secondary switches) commensurate with or sufficient to support a required electrical energy transfer from the primary converter 35 between the corresponding secondary converter or secondary converters (66, 166, 266). In one embodiment, the electronic data processor or secondary controller (33, 133, 233) can adjust or maintain the target phase offset (or delay-adjusted target phase offset for one or more corresponding secondary converters) up to a maximum phase offset (e.g., positive 90 degrees) with respect to an observed reference phase of the alternating current signal (e.g., primary AC signal at the primary terminals or the secondary AC signal at the secondary terminals of the respective transformer (64, 164, 264)) to transfer a commanded (or requested, or demanded) power from the primary converter 35 to the secondary converter (66, 166, 266). Conversely, the electronic data processor or secondary controller (33, 133, 233) can adjust or maintain the target phase offset (or delay-adjusted-target phase offset for one or more corresponding secondary converters) up to a minimum phase offset (e.g. negative 90 degrees) with respect to an observed reference phase of the alternating current signal (e.g. primary alternating current signal or the secondary alternating current signal) to transfer less power (consistent with commanded, requested or demanded power at the implement) from the primary converter 35 to the secondary converter (66, 166, 266) or reverse power flow from the secondary converter (66, 166, 266) to the primary converter 35.

Various alternate embodiments may be applied, separately or cumulatively, to adjust the target phase offset for more or more secondary converters (66, 166, 266). Under a first alternate embodiment, the delay-adjusted target phase offset can be based on the observed reference phase measured by a sensor (47, 147, 247) at a first secondary converter 66 (e.g., master converter) or first transformer, then adjusted based on an equation that characterizes a relationship (e.g., baseline relationship) between the reference target phase offsets of different secondary converters and the commanded power transfer between the primary converter 35 and one or more secondary converters (66, 166, 266). If the frequency of the primary AC signal and the frequency of the secondary AC signal are substantially equal or within a predefined tolerance, any secondary controller (33, 133, 233) can adjust the corresponding commanded power transfer to the secondary converter (66, 166, 266), by adjusting the reference target phase offset, to meet the demanded load, subject to certain technical constraints, such as a maximum permitted load associated with any secondary converter (66, 166, 266).

Under a second alternate embodiment, a delay-adjusted target phase offset can be based on the observed reference phase measured by a sensor (47, 147, 247) at a first secondary converter 66 (e.g., master converter) or first transformer, then adjusted for other secondary converters (166, 266) based on any of the following: (1) a stored phase delay data stored in the data storage device of any second secondary converter (e.g., 166, 266 or another slave converter) based on characterization, testing or factory measurements (associated with a specific vehicle-implement configuration) of the phase delay associated with a second secondary converter (166, 266), and its associated particular transmission line and transmission path to the primary AC output node 67 of the primary converter 35, and (2) a look-up table, data file, data records or data structure of a relationship between commanded, requested or demanded power at the particular secondary converter (66, 166, 266) and target phase offset for the particular secondary converter.

Under a third alternate embodiment, a first secondary controller 33 is designated as a master secondary controller, where the first secondary controller 33 estimates the three-phase voltage (e.g., aggregate three-phase voltage or one or more output phases) at the junction node 60 at the primary terminals 97 of the transformer (64, 164, 264). Each time there is a zero crossing of estimated three-phase voltage, the first secondary controller 33 generates a pulse, where the pulse is communicated to the other secondary controllers (133, 233) via a vehicle data bus, an implement data bus, a transmission line, or a communications link (e.g., high speed communications line with minimal delay or fixed, stable known delay). Accordingly, the other secondary controller (133, 233) can synchronize their respective target phase offsets for the secondary converters (166, 266) to eliminate the requirement for voltage sensors (47, 147, 247) for each corresponding secondary controller (133, 233).

As illustrated in FIG. 1, secondary converters (66, 166, 266) are shown and a single primary converter 35 is shown. The direct-current to direct-current converter 22 comprises a primary controller 31, one or more secondary controllers (33, 133, 233), a primary converter 35 and a set of secondary converters (66, 166, 266). Each secondary converter (66, 166, 266) may be associated with a secondary winding 99 or secondary terminals of a transformer (64, 164, 264). Each secondary converter (66, 166, 266) may include a controller or voltage regulator to maintain a desired or target DC voltage level output. Although in one configuration, the target voltage may be within a voltage range of approximately 12 VDC to 56 VDC, other target voltage ranges fall within the scope of the disclosure and appended claims.

At the secondary direct current bus (54, 154, 254) respective direct current (DC) outputs of secondary converters (66, 166, 266) are coupled to corresponding implement loads or sources (309, 311, 313). In one embodiment, each implement load (309, 311, 313) comprises a pair of an implement inverter (16, 18, 20) and respective electric machine (10, 12, 14) coupled to the implement inverter (16, 18, 20), where the pair may operate as an implement load (309, 311, 313) in an electric machine motoring mode. Conversely, each pair of the implement inverter (16, 18, 20) and respective electric machine (10, 12, 14) may operate as an implement source (as opposed to an implement load) in an electric machine generating mode (e.g., braking or power regeneration mode). For example, as illustrated in FIG. 1, a first secondary converter 66 is coupled to a corresponding first implement load 16 (e.g., first implement inverter); a second secondary converter 166 is coupled to a corresponding second implement inverter 18 (e.g. second implement inverter); and a third secondary converter 266 is coupled to a corresponding third implement load 20 or Nth implement load (e.g., Nth implement inverter), where N equals any positive whole number equal to or greater than three.

In one illustrative configuration, the first implement inverter 16 can accept a direct current (DC) input from the secondary DC bus 54 and convert the DC input to one or more alternating current (AC) outputs (or output phases) for application to a first electric machine 10 to control it; a second implement inverter 18 can accept a DC input from the secondary DC bus 154 and convert the DC current input to one or more alternating current (AC) outputs (or output phases) for application to a second electric machine 12 to control it; a third implement inverter 20 can accept a DC input from the secondary DC bus 254 and convert the DC input to one or more alternating current (AC) outputs for application to a third electric machine 14 to control it.

The primary converter 35 is coupled to the primary direct current (DC) bus 24 and the primary DC bus 24 is also coupled to an energy source or vehicle energy system 901. The vehicle energy system 901 may incorporate a battery, fuel cell, energy source, prime mover, internal combustion engine, series electric hybrid, a parallel electric hybrid, a generator, or an alternator.

The vehicle energy system 901 is optional and its optional components are indicted as dashed lines in FIG. 1. For example, as illustrated in FIG. 1 the vehicle energy system 901 incorporates a vehicle propulsion system of one or more of the following components: an internal combustion engine 26, a gearbox 28, an alternator generator. The vehicle energy system 901 can provide electrical energy to the primary direct current bus 24 of the primary converter 35. Here, a rectifier 32 can provide a source of direct current voltage or energy to power the direct-current to direct-current converter 22 by an alternator 30 (or generator) from the rotational mechanical energy provided, directly or indirectly via the optional gearbox 28, by an internal combustion engine 26.

As illustrated in FIG. 1 and FIG. 2 in the context of a hybrid vehicle (e.g., 50 in FIG. 6A), vehicle energy system 901 comprises an internal combustion engine 26 that provides rotational energy to an optional gearbox 28 or directly to an alternator 30, such as an alternator or a generator. In turn, the alternator 30 provides an alternating current (AC) output signal to the rectifier 32 when the rotor of alternator 30 is rotated. The components within the vehicle energy system 901 are illustrated in dashed lines because the components are optional.

In an alternate embodiment, the inverter 34 is coupled to the primary DC bus 24, where the inverter 34 converts the direct current (DC) output of the primary DC bus 24 into alternating current (AC) for application to a drive electric machine 36 (e.g., electric motor). Within the alternate embodiment of the vehicle energy system 901, the inverter 34 and the drive electric machine 36 are illustrated in dashed lines because the components are optional.

In one configuration in FIG. 3A, a voltage sensor (47, 147, 247), which may be referred to as primary phase detector, detects an observed reference phase of the primary AC signal at one or more of the following: (a) a primary winding 98 or primary terminal 97 of transformer (64, 164, 264), (b) a secondary terminal 95 or secondary winding 99 of secondary converter (66, 166, 266), or (c) an outer terminal, tap, or primary terminal 97 of an integral inductance associated with the primary winding 98 of the transformer (64, 164, 264).

As illustrated in FIG. 3A one or more voltage sensors (47, 147, 247) may be associated with each secondary converter (66, 166, 266), where at least one voltage sensor or phase detector is associated with any known output phase terminal of the secondary converter. In one configuration, the first voltage sensor 47 is associated with a first output phase of the secondary converter 66; the second voltage sensor 147 is associated with a second output phase of the secondary converter 66; a third voltage sensor 247 is associated with the third output phase of the third converter 66. Although FIG. 3A illustrates the primary converter 35 as a three-phase converter and each secondary converter (66, 166, 266) as a three-phase converter, in alternate configurations the primary converter, the secondary converter or both may be structured as single-phase converters, dual-phase converters or other multi-phase converters.

The DC-to-DC converter system 11 may be configured as a unilateral or bi-directional DC-to-DC converter. FIG. 1 and FIG. 3C illustrate the inductance 503 coupled to or to connected to the primary terminals 97 of the primary winding 98 of the transformer (e.g., to facilitate measurement of an observed phase reference associated with the transformer primary winding 98 and/or to support power transfer between, or from, the transformer primary to the secondary). Further, in FIG. 1 and FIG. 3C, the inductance 503 may be alone or coupled together with any integral inductance of the transformer (e.g., 64, 164, 264). Meanwhile, in alternate configurations, an inductance or integral inductance may be coupled to or connected with the secondary terminals 95 of the secondary winding 99 of the transformer (e.g., to facilitate measurement of an observed phase reference associated with the transformer secondary and/or to support power transfer between, or from, the transformer secondary to the primary).

In one configuration, the equivalent circuit model of the transformer (e.g., 64, 164, 264) may model, or may be characterized by, a first integral inductance or first leakage reactance associated with, or in series with, one or more primary windings 98, consistent with FIG. 3A. Further in some configurations of the transformer (e.g., 64, 164, 264), the equivalent circuit model of the transformer (e.g., 64, 164, 264) may model, or may be characterized by, a second integral inductance or second leakage reactance associated with, or in series with, one or more secondary windings 99, which is consistent with FIG. 3B. In other configurations, the equivalent circuit model of the transformer (e.g., 64, 164, 264) may model, or may be characterized by, by both the first integral inductance and the second integral inductance, which are associated with one or more primary windings 98 and one or more secondary windings 99, respectively. Further, the integral inductances in FIG. 3A may be supplemented by optional inductances 503, such as a discrete inductors, as illustrated in FIG. 3C; the integral inductances in FIG. 3B may be supplemented by optional inductances 503, such as discrete inductors, as illustrated in FIG. 3D.

In an alternate embodiment or another configuration, in FIG. 3B a voltage sensor (47, 147, 247), which may be referred to as a secondary phase detector, detects an observed reference phase of the secondary alternating current signal at a tap of a secondary winding 99 or secondary terminals 95 of the transformer (64, 164, 264) of the secondary converter (66, 166, 266). As illustrated in FIG. 3B one or more voltage sensors (47, 147, 247) may be associated with a transformer tap at each secondary converter (66, 166, 266), where at least one voltage sensor or phase detector is associated with any AC phase terminal of the secondary converter (66, 166). Here, in FIG. 3B the primary winding 98, the secondary winding 99 or both are associated with an integral inductance.

Alternately, the voltage sensor (47, 147, 247) detects an observed reference phase at a corresponding inductor terminal of an inductance 503 associated with the secondary converter (66, 166) as illustrated in FIG. 3D. For example, the secondary phase detector (e.g., 47, 147, 247) can be coupled to the secondary winding 99 of the transformer (64, 164, 264) where there is a known inductance 503 or fixed inductor between the secondary terminals 95 (of secondary winding 99) and the secondary converter (66, 166, 266). In particular, as illustrated in FIG. 3D, the inductance 503 is coupled between the secondary winding 99 of the transformer (64, 164, 264) and any secondary AC input node 75, among the first secondary AC input node 77, the second secondary AC input node 79, and the third secondary AC input node 81. In one configuration, the first voltage sensor 47 is associated with a first output phase of the secondary converter 66; the second voltage sensor 147 is associated with a second output phase of the secondary converter 66; a third voltage sensor 247 is associated with the third output phase of the third converter 66.

In one embodiment, each voltage sensor (47, 147 or 247) comprise a phase detector, such as a first phase detector, a second phase detector and a third phase detector. Each phase detector may comprise a phase comparator, a mixer and a reference oscillator, a phase extractor circuit or logic device, a phase-locked loop (PLL) device or another device for phase or frequency detection of a signal. In one example, the first phase detector (e.g., 47) or the second phase detector (e.g., 147) comprises: (a) a low-pass filter for generating a reference signal (604 in FIG. 6B) from the observed AC signal (e.g., 603) and (b) a detector for detecting when the filtered signal crosses a DC voltage reference level 605 (e.g., zero volts DC).

In one example, one or more reference voltage sensors (47, 147, 247) are connected or coupled to measure: (a) a first AC output signal of a first phase 41 at a corresponding first primary AC output node 69 for application to primary terminals 97 of the transformer (64, 164, 264); (b) a second AC output signal of a second phase 42 at a corresponding second primary AC output node 71 for application to primary terminals 97, and (c) a third AC output signal of a third phase 43 at a corresponding third primary AC output node 73 at the primary terminals 97 to provide reference signals (or observed reference phase measurements) for determination of the respective target phase offset for each of the secondary converters (66, 166, 266). The target phase offset for each secondary converter is generally unique and different from the other secondary converters based on the load. Further, in certain configurations the DC-DC converter system 11 can operate if there is limited or no communication (e.g., communication of data messages over a transmission line, communications link or wireless network) between the primary controller 31 and the secondary controller(s) (33,133, 233) because the voltage sensors (47, 147, 247) or phase sensors are available; hence, observed reference phase is available, for each respective secondary converter and its secondary controller.

For example, if there is no communication of data messages or electrical signals or limited communications of data messages or electrical signals between the primary controller 35 and the second controllers (66, 166, 266), the absence of the communication of data messages is supported by the observed reference phase measured by the sensor or the sensors (47, 147, 247) associated with each respective secondary converter (66, 166, 266) to facilitate synchronization of the phases of the (secondary) switches (e.g., for one or more phases (41, 42, 43)) at each respective secondary converter (66, 166, 266). In the absence of such communication between controllers (e.g., 31, 33, 133, 233) and subject to a predetermined maximum limit of current, torque or power programmed or stored in a data storage device of each of the secondary controllers (33, 133, 233); the secondary controller (33, 133, 233) can adjust or set the target phase offset of its corresponding secondary converter based on commanded or demanded torque or current from any load (e.g., first load 309, second load 311 or third load) on the corresponding secondary DC bus (54, 154, 254). Accordingly consistent with the above predetermined maximum limit or other technical constraints, each one of the secondary controllers (33, 133, 233) can generally adjust or set a target phase offset value with respect to the observed reference phase of its respective sensor (47, 147, 247) and the unique (e.g., fixed, continuous or variable) demanded load of the corresponding secondary converter (66, 166, 266) associated with said one of the secondary controllers.

In one embodiment, a first secondary controller 33 provides first secondary control signals for a first phase, a second phase and third phase of first secondary semiconductor switches of the first secondary converter 66 with a time-synchronized, target phase offsets with respect to the observed reference phase of the first phase (or another phase) estimated by the voltage sensor (47, 147, 247) at an inductor terminal associated with the corresponding first secondary converter 66. The first phase, the second phase or the third phase of the alternating current signal (secondary AC signal) are inputted to the respective first secondary converter 66. Similarly, a second secondary controller 133 provides second secondary control signals for a first phase, a second phase and third phase of second secondary semiconductor switches of the second secondary converter 166 with a time-synchronized, target phase offsets with respect to the respective observed reference phase of the first phase (or another phase) estimated by the second voltage sensor (47, 147, 247) of the second secondary converter 166. The first phase, second phase or the third phase of the alternating current signal is inputted to the respective second secondary converter. Similarly, a third secondary controller 233 provides third secondary control signals for a first phase, a second phase and third phase of third secondary semiconductor switches of the third secondary converter 266 with a time-synchronized, target phase offsets with respect to the respective observed reference phase of the first phase (or another phase) estimated by the second voltage sensor (47, 147, 247) of the third secondary converter 266. The first phase, second phase or the third phase of the alternating current signal is inputted to the respective second secondary converter.

In one configuration, each of the sensors (47, 147, 247) comprises a phase detector that is associated with the voltage provided by the primary for measuring or detecting the respective observed reference phase of the corresponding primary alternating current signal transmitted to the respective secondary converter (66, 166, 266). For example, the first transformer 64 is associated with (e.g., integral with or coupled to) the first secondary converter 66 and its observed reference phase of the primary AC signal; the second transformer 164 is associated with (e.g., integral with or coupled to) the second secondary converter 166 and its observed reference phase of the primary AC signal; the third transformer 264 is associated with (e.g., integral with or coupled to) the third secondary converter 266 and its observed reference phase of the primary AC signal. Further, the alternating current signal comprises a phase of the corresponding alternating current signal selected from the phases consisting of a first phase, a second phase and a third phase of the primary converter 35.

In another configuration of FIG. 3B of FIG. 3D, each of the sensors (47, 147, 247) comprises a phase detector that is associated with a secondary winding or a secondary terminal of the corresponding transformer (64, 164, 264) with an integral inductance of FIG. 3B or a separate, discrete inductance 503 of FIG. 3D for measuring or detecting the respective observed reference phase of the corresponding secondary alternating current (AC) signal transmitted to the respective secondary converter (66, 166, 266). For example, the first transformer 64 is associated with the first secondary converter 66 and its observed reference phase of the secondary AC signal; the second transformer 164 is associated with the second secondary converter 166 and its observed reference phase of the secondary AC signal; the third transformer 264 is associated with the third secondary converter 266 and its observed reference phase of the secondary AC signal. Further, the alternating current signal comprises a phase of the corresponding alternating current signal selected from the phases consisting of a first phase, a second phase and a third phase of the primary converter 35.

Some of the above configurations do not require a communications link (e.g., of sufficient bandwidth and fidelity) between: (a) the primary converter 35 and one or more secondary converters (66, 166, 266), (b) the primary controller 31 of the primary converter 35 and one or more secondary controllers (33, 133, 233) of the respective secondary converters (66, 166, 266), (c) the secondary converters (66, 166, 266), or (d) between secondary controllers (33, 133, 233) of the secondary converters (66, 166, 266), where the communications link is capable of communicating in real-time, synchronization data, phase data, or target phase offsets for phase adjustment and synchronization between the primary converters and one or more secondary converters. In particular, in certain configurations the DC-DC converter can operate if there is limited or no communication (e.g., communication of data messages over a transmission line, communications link or wireless network) between the primary controller 31 and the secondary controller(s) (33, 133, 233) because the voltage sensors (47, 147, 247) or phase sensors are available; hence, observed reference phase offset is available, for each respective secondary converter (66, 166, 266) and its respective secondary controller (33, 133, 233).

In an alternate configuration of FIG. 3A, FIG. 3B, FIG. 3C or FIG. 3D, where a communications link is available for communicating real time synchronization between the primary converters and one or more secondary converters the following configuration may be employed. For example, only one observed voltage sensor (47, 147, 247) is used for all of the secondary converters (66, 166, 266) because of the availability of a factory setting, testing, or initial calibration of phase delay adjustment data, associated with the transmission line 51 path, for a particular model, implement configuration, or vehicle implement configuration, where the phase delay adjustment data may be stored in a data storage device (303) of the primary controller 31, the secondary controllers (33, 133, 233) as a file, look-up table, inverted file, database, equation, reference parameters, or another data structure. Accordingly, during initialization of the system 11 the primary controller 31, the secondary controller 33, or the electronic data processor of the primary controller 31 or the secondary controller 33 may retrieve or access the stored phase delay adjustment data to adjust the observed reference phase offset, which is derived from phase measurements by one or more sensors (47, 147, 247) for non-reference secondary converters (e.g., 166, 266). The non-reference secondary converters (e.g., 166, 266) apply the stored phase delay adjustment data to the observed reference phase offset from the sensor 47 at the first secondary converter 66 (e.g., reference or master secondary converter) to determine or estimate phase-adjusted target phase offset. Further, if voltage sensors (47, 147, 247) associated with the second secondary converter 166 or third secondary converter 266 fail or are not available, the above alternate configuration can be used in lieu of performing the observations or measurements by the observed voltage sensors (47, 147, 247) of such secondary converters (166, 266) during each session or activation of the vehicle, or the implement, or the vehicle-implement configuration.

A primary converter 35 has an alternating current (AC) output at a primary output node or junction node 60. The secondary converters (66, 166, 266) are coupled in parallel with each other to the primary output node or junction node 60, such as first junction node 61, a second junction node 63 and a third junction node 65, as illustrated in FIG. 2. Referring to FIG. 2, a first transmission line length (e.g., of conductor 51) separates the first junction node 61 from the first primary AC output node 69; a second transmission line length (e.g., of conductor 51) separates the second junction node 63 from the second primary AC output node 71; a third transmission line length separates the third junction node 65 from the third primary AC output node 73. In certain embodiments, the first transmission line length, the second transmission line length and the third transmission line length are substantially equal, with corresponding equal impedances, at the junction node 60 that comprises the first junction node 61, the second junction node 63 and the third junction node 65. The primary output node or junction node 60 may be connected to the transformers (64, 164, 264). The primary output node or junction node 60 is coupled to secondary converters (66, 166, 266) via transformers (64, 164, 264). Each secondary converter (66, 166, 266) is associated with a corresponding transformer (64, 164, 264), or one or more secondary windings. Each transformer (64, 164, 264) provides an intermediate interface (for the AC signal) between the primary converter 35 and a secondary converter (66, 166, 266).

Secondary converters (66, 166, 266) are coupled in parallel to a primary converter 35 via a set of conductors 51 (in FIG. 1). Each secondary converter (66, 166, 266) may have a corresponding secondary position (e.g., in three dimensions or three-dimensional coordinates), on the vehicle-implement configuration, that is spatially separated from a primary position (e.g., in three dimensions or three-dimensional coordinates) of the primary converter 35 such that the set of conductors 51 that service the secondary converter (between the junction 60 and the secondary AC input node terminals 75 of the secondary converter) has a unique transmission line length with a respective impedance that arises from the separation (e.g., actual cable harness or conductor length associated with the difference between the primary position and secondary position) between the primary converter 35 and the respective secondary converter (66, 166, 266).

Each secondary converter (66, 166, 266) has secondary semiconductor switches. To compensate for the respective transmission line delay for the alternating current signal on conductors 51, between the primary converter 35 and the corresponding secondary converter (66, 166, 266), a secondary controller (33, 133, 233) provides secondary control signals to the secondary semiconductor switches of the secondary converters with one or more time-synchronized, target phase offsets (e.g., respective custom phase offset or unique phase offset tailored or suited to each corresponding secondary converter) with respect to an observed reference phase (e.g., observed phase measurements) of the alternating current signal (e.g., primary alternating current signal or the secondary alternating current signal) to provide the target phase offset (or targeted phase offsets) commensurate with or sufficient to support a required electrical energy transfer from the primary converter 35 to the corresponding secondary converter (or secondary converters 66, 166, 266). The respective transmission delay of the AC signal on conductor may be affected by respective impedances in the transmission line path between the primary converter 35 and the corresponding secondary converter (66, 166, 266), for example.

In one embodiment, the secondary position of a corresponding secondary converter (66, 166, 266) comprises a lateral position associated with a particular row unit or particular set of row units of an implement 56. In practice, some implements may have lateral positions that span over a range of approximately 40 meters. Accordingly, the set of conductors 51 that service the secondary converter (66, 166, 266) has a unique transmission line length with a respective impedance that arises from a spatial separation, on the vehicle-implement configuration, between the primary position of primary converter 35 and the respective secondary converter (66, 166, 266). To compensate for the respective impedance associated with each corresponding secondary converter (66, 166, 266), one or more secondary controllers (33, 133, 233) provide secondary control signals to the secondary semiconductor switches (of one or more secondary converters) with a time-synchronized, target phase offset with respect to a primary AC signal or a secondary AC signal observed by a voltage sensor (47, 147, 247).

In one embodiment, the (reference) voltage sensor (47, 147, 247) comprises a phase detector that can detect a reference phase of the AC output signal of one or more phases of the primary converter 35: (a) at the primary winding 98 or primary terminals 97, or (b) at the secondary winding 99 or secondary terminals 95. The secondary controller (33, 133, 233), or its electronic data processor, can estimate or determine a different target phase offset (e.g., $\Phi_1$ or $\Phi_2$ as illustrated in FIG. 5A) for each secondary converter (66, 166, 266) based on one or more of the following: (1) observed reference phase measurements at the transformer terminals (e.g., primary terminals 97 or secondary terminals 95) associated such secondary converter (66, 166, 266), or (2) observed phase reference measurements at the voltage sensor (47) at the first secondary converter 66, and stored phase-delay adjustment data stored in the data storage device (303) of secondary controller 33, and/or (3) demanded, required or commanded power (e.g., expressed a percentage of maximum available power or a ratio of commanded power to maximum available power) at one or more secondary DC buses (54, 154, 254) (e.g., as perceived by the primary controller 31, or collectively by one or more secondary controllers (33, 133, 233), which can communicate with one another via a vehicle data bus, an implement data bus, or communications line.

Although the above secondary controller (33, 133, 233) may estimate the corresponding target phase offsets by communication of data messages or signals solely between the secondary controllers (33, 133, 233) without communication of data messages or signals between any secondary controller (33, 133, 233) and the primary controller 31, in alternate configurations there may be a communications link, such as a transmission line, wireless link, or vehicular wireless network connection to support communications of data messages or signals between or among the primary controller 31 and one or more secondary controller (33, 133, 233). For example, in an alternate configuration, the primary controller 31 may provide) demanded, required or commanded power (e.g., expressed a percentage of maximum available power or a ratio of commanded power to maximum available power) at one or more secondary DC buses (54, 154, 254) (e.g., as perceived by the primary controller 31, rather than relying upon or aggregating demanded, required or commanded power from each of the secondary DC buses (54, 154, 254) with an actual load (e.g., active, or time-varying load).

To the extent there is a communications link, such as a transmission line, wireless link, or vehicular wireless network connection to support communications of data messages or signals between or among the primary controller 31 and one or more secondary controllers (33, 133, 233), the following examples may be used, separately or collectively, to facilitate control of the secondary converters by respective secondary controllers. Under a first example, each secondary controller (33, 133, 233) is configured to estimate demanded load at its corresponding secondary converter (66, 166, 266) and to communicate the estimated demanded load to one or more other secondary controllers (hence, the secondary converters) over a communications line or wireless network. Under a second example, each secondary controller (33, 133, 233) is configured to estimate demanded load at its corresponding secondary converter (66, 166, 266) or set of converters and to communicate the estimated demanded load to the primary controller 31 over a communications line or wireless network such that the primary controller 31 can estimate a peak, total, mean, mode, or aggregate demanded load on the primary AC output node 67, or associated with all of the secondary DC buses (54, 154, 254). Under a third example, the primary controller (33, 133, 233) is configured to estimate total, aggregate demanded load at the primary controller 31 and communicate the total, aggregate demanded load with one or more secondary controllers 33 over the communication line or the wireless network.

In certain configurations or alternate configurations, the communications link or communications path between any set of two or more controllers (e.g., primary controller 31 and any secondary controller (33, 133, 233)) is not available, is not present, is not functional, or is minimal. For example, the communications link or communications path between any set of the controllers (31, 33, 133, 233): (a) may not be supported by an available wiring harness, controller area network (CAN) data bus (e.g., ISOBUS-compliant data bus), implement data bus, vehicle data bus, or a wireless communications network, or (b) may not be available because of busy or excessive traffic on the wiring harness, controller area network (CAN) data bus, implement data bus, vehicle data bus, or a wireless communications network. and/or (c) may not be available because of the design of the vehicle or the implement system. In particular, in certain embodiments the DC-DC converter can operate if there is limited or no communication (e.g., communication of data messages over a transmission line, communications link or wireless network) between the primary controller 31 and the secondary controller(s) (33, 133, 233) because the voltage sensors (47, 147, 247) or phase sensors are available; hence, observed reference phase offset is available, for each respective secondary converter (66, 166, 266) and its respective secondary controller (33, 133, 233).

In one exemplary configuration, the particular transmission line length (e.g., of conductors 51) of the AC line between the primary converter 35 and any corresponding secondary converter (66, 166, 266) comprises a transmission line length between the AC output node (69, 71, 73) of primary converter 35 and the primary terminals (of the primary windings 98) of respective one of the transformers (64, 164, 264). At each secondary inverter (66, 166, 266), the secondary AC input terminals 75 (e.g., AC input node) comprises a first secondary AC input node 77, a second secondary AC input node 79 and a third secondary AC input node 81, as illustrated in FIG. 3A.

In FIG. 5A, in one configuration the impedance (e.g., combination of resistance and frequency varying inductance based on the frequency of AC signal in the AC line) of the particular transmission line length (e.g., of conductors 51) of the AC line between the primary converter 35 and any corresponding secondary converter (66, 166, 266) means an aggregate particular impedance that comprises one or more of the following: (a) a primary impedance 501 (in FIG. 5A), where the primary impedance 501 arises from, or is associated with, the primary length of cable, transmission line or conductors between the primary AC output node 67 of the primary converter 35 and the junction node 60, which provides the same phase lag or delay to all of the secondary converters (66, 166, 266); or (b) a secondary impedance 502 (in FIG. 5A) between the junction node 60 and AC input node terminals 75 of each secondary converter (66, 166, 266), or its respective transformer (64, 164, 264), wherein the secondary impedance 502 is different (e.g., and phase lag is different) for each secondary converter (66, 166, 266) with a different cable length between the junction node 60 the corresponding AC input node terminals 75 (or the transformer) of each secondary converter (66, 166, 266); (c) modeled transformer inductance, such as leakage inductance 503'.

Figure 5B:
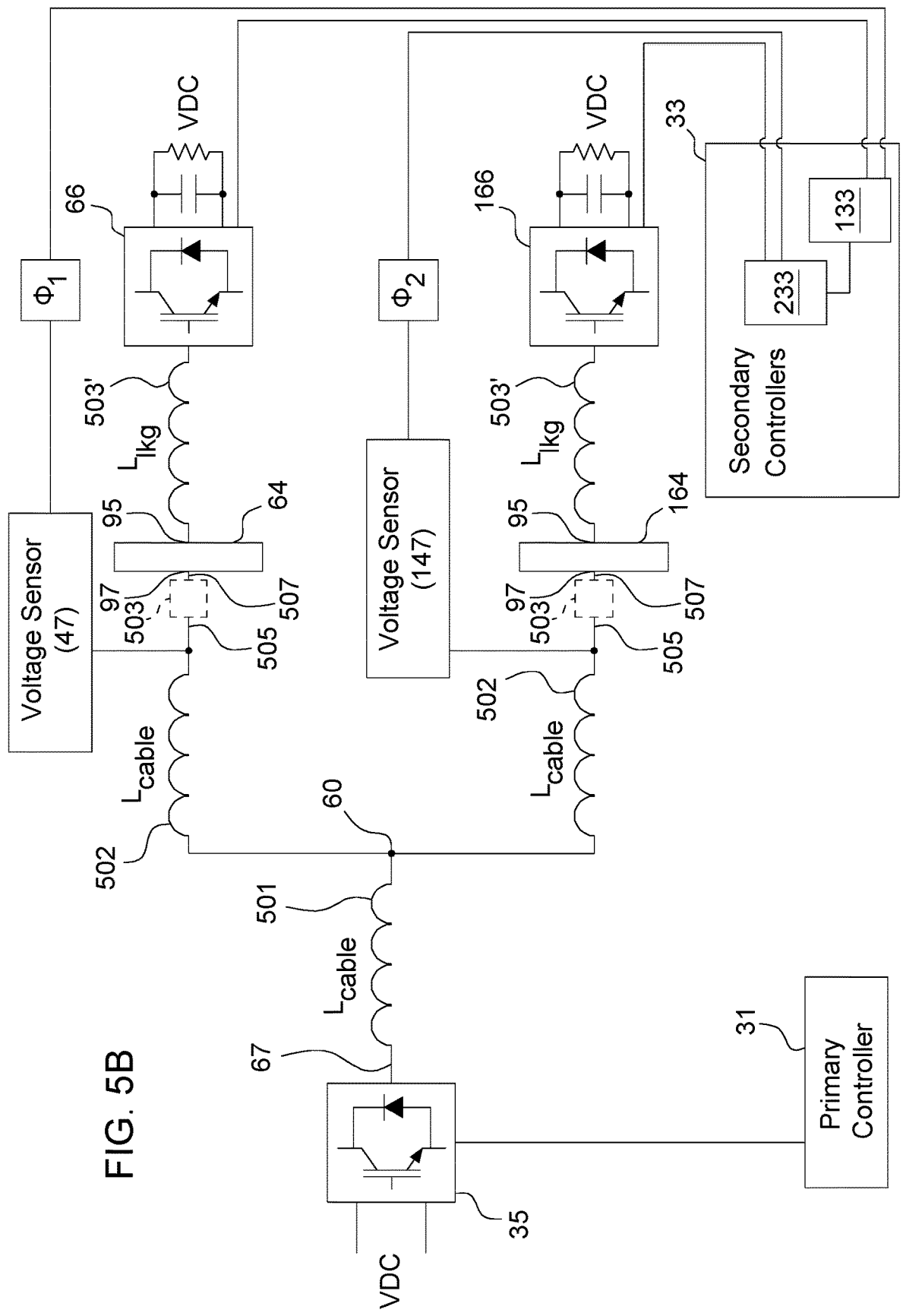
FIG. 5B is a schematic diagram of another embodiment of a DC-to-DC converter system that illustrates a potential inductance in a cable or transmission line between the primary converter and the secondary converter.

As illustrated in FIG. 5A, the leakage inductance 503' or integral inductance may be modeled in series with the primary winding 98 of the transformer (64, 164, 264). Alternately, as illustrated in FIG. 5B, the leakage inductance 503' or integral inductance may be modeled in series with the secondary winding 99 of the transformer (64, 164, 264). Further, it is possible that leakage inductance 503' is present at the primary terminals 97, the secondary terminals 95 of the transformer, or both. In practice, the leakage inductance 503' may contribute to the estimation of the transformer input impedance and/or output impedance; can impact the selection of or optimization of the value of any discrete inductance 503.

The systems of FIG. 1 and FIG. 2 are similar, except the system of FIG. 2 further includes an electric load (68, 168), rather than an electric machine (10, 12, 14) of FIG. 1. In either FIG. 1 or FIG. 2, the load may comprise any electric load, such as electric motor or some other non-rotating electric load. Like numbers in FIG. 1 and FIG. 2 indicate like features or elements. In one configuration, in FIG. 2 an optional inverter may be coupled between the secondary converter 66 and the electric load 68 to convert the DC of the secondary DC bus 54 to AC for the electric load 68. Similarly, in FIG. 2 an optional inverter 170 may be coupled between the secondary converter 166 and the electric load 168 to convert the DC of the secondary DC bus 54 to AC for the electric load 168.

Although FIG. 1 illustrates a first load 309 as a combination of a first implement inverter 16 coupled to a first electric machine 10; a second load 311 as the combination of a second implement inverter 18 coupled to a second electric machine 12; and a third load 313 as the combination of an Nth (e.g., third) implement inverter 20 coupled to an Nth (e.g., third) electric machine 14, the first load 309, second load 311, and third load 313 of FIG. 1 may comprise any type of electric load.

In the context of FIG. 1 and FIG. 2, the vehicle energy system (901, 909) may comprise an energy source or any of the following: an alternator/generator 30, a battery or a capacitor (e.g., capacitor bank), where the alternator/generator 30 receives rotational mechanical energy from an internal combustion engine 26, directly, or indirectly via a gearbox 28. If the alternator 30 outputs AC signal, an optional rectifier 32 rectifies the signal for application to the primary DC bus 24.

The vehicle energy system (901, 909) is coupled to the direct current (DC) primary terminals (e.g., input terminals) and/or the primary DC bus 24. For example, as illustrated in FIG. 1 and FIG. 2, the vehicle energy system (901) or energy source comprises a generator/alternator 30 that is coupled or connected to the primary DC bus 24 via an optional rectifier 32. However, if the generator/alternator 30 comprises a generator that outputs DC signal, the optional rectifier 32 may be omitted or replaced with a DC voltage regulator.

One or more loads (e.g., electric machines, 10, 12, 14, 68, 168) are coupled to the primary DC bus 24 or the secondary DC bus 54. In FIG. 1, the first electric machine 10, second electric machine 12, and the Nth electric machine 14 are loads that are coupled to the secondary DC bus (54, 154, 254) via one or more inverters (16, 18, 20), where N is any positive whole number equal to or greater than three. Similarly, the drive electric machine 36 is a load that is connected to the primary DC bus 24 via an inverter 34. Each particular secondary controller (33, 133, 233), or its electronic data processor, may determine a target phase offset for its respective secondary converter (66, 166, 266); hence, the commanded phase and associated power transfer between (e.g., from) the primary converter 35 to the particular secondary converter (66, 166, 266) based on the power demanded by the respective load on the particular secondary converter (66, 166, 266).

The DC-to-DC converter 22 that comprises the primary converter 35, the secondary converter and the transformer (64, 164, 264) can operate bi-directionally, such as where the electrical energy is transferred in either direction between the DC primary terminals (of the primary DC bus 24) and the DC secondary terminals (of one or more secondary DC buses 54, 154, 254). In one direction, the energy source at the DC primary terminals 83 of the primary DC bus 24 can power one or more loads at the DC secondary terminals (84) of the secondary DC buses (54, 154, 254). However, in the opposite direction, one or more loads at the DC secondary terminals 84 can provide excess or transient energy to the DC primary terminals to charge the energy source (e.g., in a braking mode of the vehicle 50).

For example, if a first load 309, a second load 311 and or a third load 313 operate in a motoring mode, each of the first load 309, the second load 311 and/or the third load 313 may comprise an implement inverter (16, 18, 20) that receives electrical energy from its respective secondary DC bus (54, 154, 254) and provides alternating current to control a corresponding electric machine (10, 12, 14) in the motoring mode. Conversely, if a first load 309, a second load 311 and/or a third load 313 are configured to operate in a power generating mode or power regeneration mode, each one of the first load 309, the second load 311 and/or the third load 313 comprise an electric machine (10, 12, 14, e.g., motor/generator) that converts rotational energy (e.g., via braking, moving down sloped terrain, or from electric machine flywheel momentum) to electrical energy for input to a corresponding implement inverter (16, 18, 20) for application to respective DC secondary buses (54, 154, 254).

As illustrated in FIG. 3A, one or more capacitors can be used for filtering. For example, a primary capacitor 46 is placed across the DC primary terminals 83 and a secondary capacitor 46 is placed across the DC secondary terminals 84, where the primary capacitor 46 and the secondary capacitor 46 are used for filtering (e.g., to reduce noise, such as voltage ripple in the DC voltage).

In certain embodiments, the DC primary terminals 83 are configured to operate at a different voltage level than the DC secondary terminals 84. In other embodiments, the primary DC bus 24 and the secondary DC bus 54 can have variable voltage levels that can fluctuate with one or more loads or operating conditions on a dynamic basis for each time interval (e.g., sampling time of DC voltage observed at the DC primary input and DC secondary output terminals of the converter). For example, the DC primary terminals 83 operate at a higher voltage level or higher voltage range (e.g., approximately 400 VDC to approximately 800 VDC) than a lower voltage level or lower voltage range (e.g., approximately 12 VDC to approximately 400 VDC) the DC secondary terminals 84. Accordingly, the electronic assembly or DC-to-DC converter 22 supports a vehicle 50 with different DC bus levels that are isolated from each other because the transformer (64, 164, 264) blocks DC energy from passing through between transformer primary and transformer secondary.

Although the DC primary terminals (e.g., DC primary bus) and the DC secondary terminals (e.g., DC secondary bus) have fixed voltage levels, the primary voltage ($V_1$) at (or across) the transformer primary winding 98, or the secondary voltage ($V_2$) at (or across) the transformer secondary winding 99, or both can vary.

FIG. 3A is a schematic diagram of one embodiment of a direct-current-to-direct-current converter 22 (DC-to-DC converter) that comprises a primary converter 35 coupled to a secondary converter (66, 166, 266) via a transformer (64, 164). A primary converter 35 comprises first pair of primary switches, a second pair of primary switches, and a third pair of primary switches. In a first phase 41 the first pair of primary switches is coupled between direct current (DC) primary terminals 83 (e.g., input terminals) of the primary converter 35; in the second phase 42 the second pair of primary switches is coupled between DC primary terminals 83 (e.g., input terminals) of the primary converter 35; in the third phase 43 the third pair of primary switches is coupled between DC primary terminals 83 (e.g., input terminals) of the primary converter 35. The first pair, second pair and third pair of primary switches may be referred to as a primary converter 35, where the primary controller 31 controls the primary switches of the primary converter 35.

In one embodiment, the DC-to-DC converter 22 comprises a three-phase, dual DC-to-DC converter 22 with DC primary terminals 83 (e.g., DC input terminals) at the primary converter 35 and DC secondary terminals (84, 184, e.g., DC output terminals) at the secondary converters (66, 166, 266), where the DC-to-DC converter 22 may operate unidirectionally or bidirectionally (e.g., to transfer electrical power or energy from the DC primary terminals 83 of the primary converter 35 to the DC secondary terminals (84, 184) of the secondary converter (66, 166), or vice versa). Although the DC-DC converter 22 is illustrated as a three-phase converter, the DC-DC converter may alternately be configured as a single-phase converter, a dual-phase converter, or a multi-phase converter, for example.

Each pair of primary switches comprises a low-side switch 44 and a high-side switch 45. Similarly, each pair of secondary switches comprises a low-side switch 44 and a high-side switch 45. Each switch has switched terminals that are controlled by a control terminal (e.g., gate or base of a transistor). For example, if the switch is a field effect transistor, such as a metal oxide semiconductor field effect transistor (MOSFET) (e.g., Silicon Carbide MOSFET), the switched terminals comprise a source and drain terminal and the control terminal comprises a gate terminal. In one configuration, for each pair of primary switches, the switched terminals of the low-side switch 44 are coupled in series to the switched terminals of the high-side switch 45 between the DC primary terminals 83. As illustrated in FIG. 3A, each switch has a protective diode coupled in parallel to the switched terminals of the respective switch. In one embodiment, the switches may comprise silicon carbide field effect transistors or other wide-band-gap semiconductor devices.

In the primary converter 35, the switched terminals of the first pair of low-side switch 44 and the high-side switch 45 are coupled together at a first node or first primary AC output node 69 associated with a first phase of primary alternating current (AC) signal. In the primary converter 35, the switched terminals of the second pair of low-side switch 44 and the high-side switch 45 are coupled together at a second node or second primary AC output node 71 associated with a second phase of the primary alternating current signal. In the primary converter 35, the switched terminals of the third pair of low-side switch 44 and the high-side switch 45 are coupled together at a third node or third primary AC output node 73 associated with a third phase of the primary alternating current signal.

Although the primary converter 35 is illustrated as an exemplary bilevel converter configuration in the drawing and accompanying text of this document, in an alternate embodiment, the primary converter 35 may be configured as a multilevel converter configuration.

A secondary converter (66, 166, 266) comprises a first pair of secondary switches, a second pair of secondary switches, and a third pair of secondary switches between DC secondary terminals 84 (e.g., output terminals) of the secondary converter (66, 166, 266). In the first phase 41 the first pair of secondary switches is coupled between direct current secondary terminals 84 (e.g., output terminals) of the secondary converter (66, 166, 266); in the second phase 42 the second pair of secondary switches is coupled between DC secondary terminals 84 (e.g., output terminals) of the secondary converter (66, 166, 266); in the third phase 43 the third pair of secondary switches is coupled between DC secondary terminals (e.g., output terminals) of the secondary converter (66, 166, 266).

Although each secondary converter (66, 166, 266) is illustrated as an exemplary bilevel converter configuration in the drawing and accompanying text of this document, in an alternate embodiment, any secondary converter (66, 166, 266) may be configured as a multilevel converter configuration.

Each pair of secondary switches comprises a low-side switch 44 and a high side switch 45. Each secondary switch has switched terminals that are controlled by a control terminal (e.g., gate or base). For example, if the switch is a field effect transistor, such as a metal oxide semiconductor field effect transistor (MOSFET) (e.g., silicon carbide MOS- FET devices), the switched terminals comprise a source and drain terminal and the control terminal comprises a gate terminal. As illustrated in FIG. 3A, each secondary switch has a protective diode coupled in parallel to the switched terminals of the respective switch.

In the secondary converter (66, 166, 266), in the first phase 41 the switched terminals of the first pair of secondary switches, which comprise a low-side switch 44 and the high-side switch 45, are coupled together at a fourth node (e.g., first secondary AC input node 77) associated with a secondary alternating current signal. In the second phase 42 in the secondary converter 66, the switched terminals of the second pair of the secondary switches, which comprise a low-side switch 44 and the high-side switch 45 are coupled together at a fifth node (e.g., second secondary AC input node 79) associated with the secondary alternating current signal. In the third phase 43 of the secondary converter, the switched terminals of the third pair of the secondary switches, which comprise a low-side switch 44 and the high-side switch 45 are coupled together at a sixth node (e.g., third secondary AC input node 81) associated with the secondary alternating current signal.

In one embodiment, a transformer (64, 164, 264) is coupled (e.g., in the alternating current transmission line) between the primary converter 35 and the secondary converter (66, 166, 266). For example, at the primary terminals 97 primary winding 98 of the transformer (64, 164) is coupled to a first node (e.g., first primary AC output node 69) of the first pair of primary switches; a second node (e.g., second primary AC output node 71) of second pair of primary switches, and a third node (e.g., third primary AC output node 73) of the third pair of primary switches. Similarly, at the secondary terminals a secondary winding 99 of the transformer (64,164) is coupled to a fourth node (e.g., first secondary AC input node 77), the fifth node (e.g., second secondary AC input node 79) and the sixth node (e.g., third secondary AC input node 81).

The transformer (64, 164, 264) has at least one primary winding 98 and at least one secondary winding 99, where a transformer ratio (n) represents a voltage ratio between the primary terminals and the secondary terminals, or between the primary winding 98 and the secondary winding 99. For example, the primary winding ratio may represent the number of relative turns (n) of the primary winding 98 to the secondary winding 99. The voltage ratio or winding ratio (turn ratio) may depend upon the winding configuration, the conductor configuration, and the configuration of any core, such as ferromagnetic core, a ferrite core, or an iron core.

In one embodiment, a modeled inductance ($L_{lkg}$) 503' (e.g., variable inductor) is in series with the primary winding 98 (or secondary winding 99) of the transformer (64, 164, 264), or is modeled as leakage inductance or cross-coupling inductance of the transformer and/or conductors for different secondary converters (66, 166, 266).

In an alternate embodiment, the modeled inductance is associated with a set of discrete inductors that can be connected, via a set of switches, in series, in a parallel, or both, to achieve an adjustable aggregate inductance. For example, the controller (31, 33) or data processor 302 can control or adjust the variable inductor, or its associated switches, to tune the transformer (64, 164, 264) to adjust the total inductance based on meeting one or more secondary loads (309, 311, 313).

In one embodiment, in FIG. 3A an electronic data processor 302, such as an electronic controller, is configured to provide time-synchronized control signals to the control terminals of the primary switches and secondary switches to control the converter to operate efficiently with respect to a reference signal derived from observations or measurements of the voltage sensor 47 at the AC output node of the primary converter 35. Further, with an optional communications link, or the like, between the primary controller 31 and the secondary controller (33, 133, 233), the primary controller 31 and the secondary controller (33, 133, 233) can control, with synchronization relative to the reference signal, the switches of primary converter 35 and the secondary converter to operate in a first control mode, a second control mode, or a third control mode, wherein the first control mode comprises a phase-shift mode, the second control mode comprises a triangular waveform control mode and wherein the third control mode comprises a trapezoidal waveform control mode.

In one embodiment, the primary controller 31, the secondary controller (33, 133, 233) or both may be referred to as a controller; the controller comprises an electronic data processor 302, a data storage device 303, and one or more data ports 304 coupled to or in communication with a data bus 301. The electronic data processor 302, the data storage device 303, and one or more data ports 304 may communicate data messages between each other via the data bus 301.

The electronic data processor 302 comprises a microcontroller, a microprocessor, a programmable logic array, a logic device, an arithmetic logic unit, a digital signal processor, an application specific integrated circuit or another device for processing or manipulating data. The data storage device 303 comprises electronic memory, nonvolatile random-access memory, magnetic storage device, an optical storage device, or another device for storing, retrieving and managing data, files, data structures or data records. The data ports 304 may comprise an input/output port, a data transceiver, a wireline transceiver, a wireless transceiver, buffer memory, or a combination of the foregoing items.

In one embodiment, the electronic data processor 302 or its data ports 304 are connected to or in communication with the control terminals of the switches (e.g., primary switches and the secondary switches) of the primary converter 35 and the secondary converter. Accordingly, the electronic controller (31, 33) can control the synchronization, timing and operation of each switch (e.g., primary switch or secondary switch), such as activation time, deactivation time, biasing and other aspects with respect to one or more other switches (e.g., primary switch or secondary switch) with respect to the reference signal (e.g., synchronization pulse) provided by the voltage at the primary output node or AC output of the primary converter 35. Further, the switches can operate with a same or substantially similar fixed duty cycle (e.g., 50 percent duty cycle plus or minus ten percent tolerance) for multiple or all modulation modes, such as the first mode, the second mode and the third mode. In some configurations, the peak magnitude and duration of the gate signal of the high-side switch 45 and low-side switch 44 of any pair or phase will generally be equal or substantially equivalent.

The system of FIG. 3B is similar to the system of FIG. 3A, except the system of FIG. 3B has voltage sensors (47, 147, 247) that measure the secondary AC signal at secondary windings 99 of the transformer (64, 164, 264). Meanwhile, the system of FIG. 3A has voltage sensors (47, 147, 247) that measure the primary AC signal at primary windings 98 of the transformer (64, 164, 264). Like reference numbers in FIG. 3A and FIG. 3B indicate like elements or features.

Figure 4:
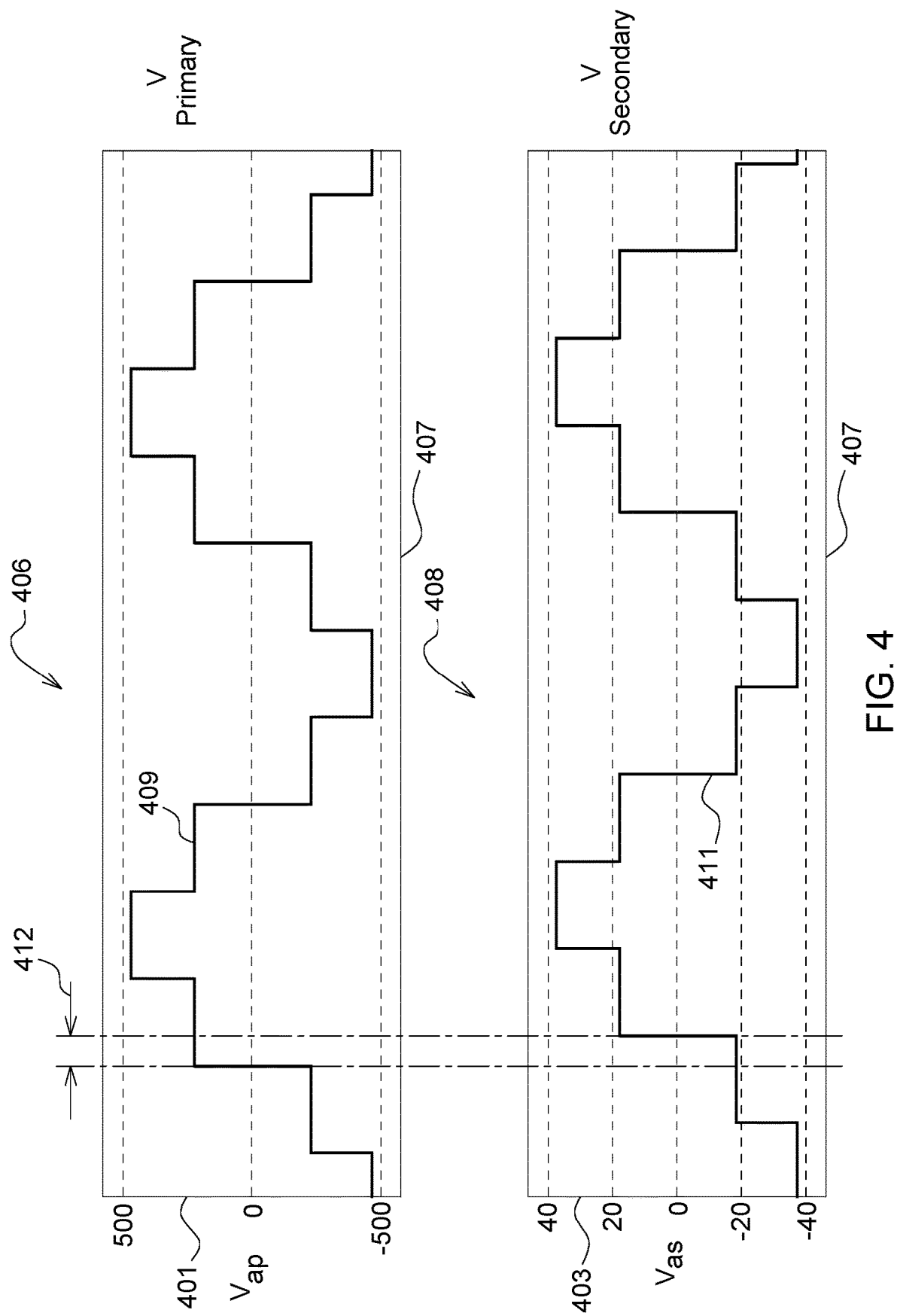
FIG. 4 discloses illustrative graphs of the primary voltage of the transformer versus time and the secondary voltage of the transformer versus time.

An upper graph of FIG. 4 illustrates a primary waveform 406 of the primary voltage 401 of the transformer (64, 164, 264) versus time 407. Meanwhile, a lower graph of FIG. 4 illustrates a secondary waveform 408 of the secondary voltage 403 of the transformer (64, 164, 264) versus time 407. In the upper graph and the lower graph, the vertical axis indicates the signal magnitude (401, 403), whereas the horizontal axis represents time 407. As illustrated, the primary voltage 409 of primary waveform 406 has a greater magnitude than the secondary voltage 411 of the secondary waveform 408, where the primary voltage 409 and the secondary voltage 411 are proportional to each other; governed by the winding ratio or number of relative turns (n) between the primary winding 98 and the secondary winding 99 of the transformer (64, 164, 264). Further, the secondary voltage 403 (and secondary waveform 408) has a phase lag 412 or phase delay with respect to the primary voltage 401 (and primary waveform 406) if power is flowing from the primary winding 98 to the secondary winding 99 (e.g., from the primary DC bus 24 to the implement load). Conversely, the secondary voltage can lead the primary voltage if the power is flowing from the secondary to the primary (e.g., from an implement load (acting in a power generating or regeneration mode) to the primary DC bus 24).

FIG. 5A is a schematic diagram that illustrates a potential inductance in a cable or transmission line between the primary converter 35 and one or more secondary converters (66, 166, 266). FIG. 5A illustrates the primary converter 35 is associated with a set of secondary converters (66, 166, 266) that are coupled to parallel to the AC output nodes of the primary converter 35. In FIG. 5A, the cables, conductors or transmission lines between the primary converters 35 and the secondary converters (66, 166, 266) can be modeled as illustrative primary inductances 501 and secondary inductances 502. Further, an additional modeled inductance 503 or variable inductor is associated with each transformer (64, 164, 264), such as leakage inductance or cross-coupling inductance between different conductors 51 associated with corresponding respective secondary converters (66, 166, 266).

FIG. 6A is an illustrative block diagram of a primary converter 35 that is coupled to multiple secondary converters (66, 166, 266), where each secondary converter is associated with a transformer (64, 164, 264, 364, 464) and an implement 56. A vehicle 50 moves or tows an implement 56 or trailer. For example, each secondary converter (66, 166, 266, 366, 466) is associated with a corresponding transformer (64, 164, 264, 364), which can be located at or near the intersection of longitudinal member 608 (e.g., longitudinal implement member) with a transverse member 606 (e.g., transverse implement member) that is generally orthogonal to the longitudinal implement member 608.

In FIG. 6B, the reference voltage sensor (47, 147, 247) or phase detector can use the leading edge of pulse train or zero crossing point 605 of the AC signal (e.g., primary AC signal or secondary AC signal) as a reference phase measurement for synchronizing the application of control signals to the switches of the primary converter 35 and the secondary converters (66, 166, 266). FIG. 6B is a graph of the signal magnitude 601 versus time 602 of the reference signal 603 measured at the junction node 60 and correlated to the local reference signal 604 of the primary controller 31, or the secondary controller (33, 133, 233) shown in dashed lines.

The phase reference or phase reference measurement is available for the secondary controller (33, 133, 233) to derive a target phase offset from the phase reference to apply to each secondary converter (66, 166, 266). One or more secondary controllers (33, 133, 233) can provide a unique or particular target phase offset for each secondary converter (66, 166, 266) that is matched or commensurate with its different cable length or different phase delay owing to the vehicle-implement configuration, such as its transverse position (e.g., raw position) of or on the transverse member 606. For example, each transverse position of the secondary converters is associated with a different section of the implement (e.g., sprayer section) or corresponding different row unit or corresponding different set of row units. For an implement, each row unit is associated with a row spacing (e.g., 24 inches, 30 inches, or 36 inches), such as a fixed row spacing or a variable row spacing.

In one embodiment, as illustrated in FIG. 6A, each secondary converter (66, 166, 266, 366, 466) has a different transverse position along the transverse member 606 of an implement 56 of the vehicle-implement configuration, which provides a route or path for the different transmission line lengths (e.g., cable lengths) between the primary AC output node 67 (of the primary converter 35) and the corresponding AC input terminals of each secondary converter (66, 166, 266, 366, 466), or its respective transformer (64, 164, 264, 364, 464). However, in alternate embodiments, the secondary converters (66, 166, 266, 366, 466), which are electrically coupled to the primary converter 35 via conductors, may have virtually any relative spatial separation, relative orientation or relative position with respect to each other to accommodate different machine forms, vehicles, and implements.

In one example, the vehicle-implement configuration may comprise a vehicle 50 with an integral implement 56, such as a sprayer with a traverse member 606 (e.g., boom, such as a 40 meter long boom, with sprayer nozzles) of the implement 56 that is generally orthogonal to a longitudinal axis 609 of the vehicle 50, the implement 56, or both. In another example, the vehicle-implement configuration may comprise a propulsion vehicle 50 or a tractor that tows an implement 56, such as planter or cultivator with row units separated from each other by transverse spatial separations (610, 612) along a transverse member 606 of the implement 56 that is generally orthogonal to a longitudinal axis 609 (and a longitudinal implement member 608) of the vehicle 50, the implement 56, or both.

Accordingly, in some configurations of the vehicle-implement configuration, each secondary converter (66, 166, 266, 366, 466) has a different secondary inductance 502 or different phase delay (e.g., phase lag) with respect to the AC output node 67 of the primary converter 35 or the junction node 60. Accordingly, one or more secondary controllers (33, 133, 233) provides a corresponding different target phase offset in the secondary control signals to each secondary converter (66 166, 266, 366, 466) based on the observed reference phase measurements detected by one or more sensors (47, 147, 247), to provide the target phase offset (or targeted phase offsets) commensurate with or sufficient to support a required electrical energy transfer from the primary converter 35 to the corresponding secondary converter (or secondary converters 66, 166, 266).

In one embodiment, the primary converter 35 comprises a three-phase converter and each of the secondary converters comprises a three-phase converter. In one configuration, the vehicle-implement configuration comprises the primary converter 35 mounted on a vehicle 50 with propulsion unit, where the secondary converters (66, 166, 266) are mounted on an implement 56 that is towed or carried by the vehicle 50. The implement 56 may comprise row units (58, 158, 258) mounted on a traverse member 606 that is generally orthogonal to a longitudinal axis 609 of the implement 56 or vehicle 50, where the longitudinal axis 609 of the vehicle 50

(or implement) is typically aligned with the vehicle heading or yaw angle (or implement heading) in the direction of travel.

As illustrated in FIG. 6A, the row units include a first row unit 58, a second row unit 158 and third or Nth row unit 258, where N equals any positive whole number equal to or greater than three. In certain embodiments, each row unit (58, 158, 258) has an electric motor, actuator or load that is coupled to a corresponding one of the secondary converters (66, 166, 256) to distribute, eject, inject, spray seed, plants, rootstock, or crop inputs, such as pesticide, fertilizer, nutrients, herbicide, fungicide, or other treatments. Further in some configurations, a set or section of electric motors, solenoids, electromechanical valves, actuators or loads for one or more rows (e.g., row units) or sections, of an implement, may be coupled to a corresponding secondary converter (66, 166, 256) to distribute, eject, inject, spray seed, plants, rootstock, or crop inputs, such as pesticide, fertilizer, nutrients, herbicide, fungicide, or other treatments. In other embodiments, for each row unit (58, 158, 258) the electric motor is coupled to the corresponding one of the secondary converters (66, 166, 266) via respective one of the implement inverters (16, 18, 20) to control the torque or velocity of the electric motor.

The primary controller 31 and the secondary controller (33, 133, 233) may control the primary converter 35 and the secondary converter with pulse width modulation, phase modulation, space vector pulse width modulation or other modulation techniques, along with the the target phase offset of each secondary converters with respect to observed phase measurements of the primary AC signal and the secondary AC signal to control or manage power transfer from the primary converter 35 to one or more secondary converters (66, 166, 266). Further, the AC waveform at the AC output for the primary converter 35 may be sinusoidal, triangular or trapezoidal to support efficient operation of the primary converter 35 and the secondary converters (66, 166, 266) with soft-switching events to minimize aggregate heat dissipation requirements of the direct-current to direct-current converter 22.

The DC-DC converter system is well suited for application to a tractor-implement system where the DC power is needed at the implement. The vehicle energy system (e.g., 901) can generate electrical energy for the primary DC bus (e.g., primary DC bus 24). Uni-directional or bi-directional power transfer of the electrical energy between the primary (e.g., primary DC bus 24) and secondary (e.g., secondary DC buses 54, 154, 254) via the transformers and AC transmission lines 51 is possible in a controlled manner even though the primary converter and the secondary converter(s) are physically spaced apart from each other on the vehicle and the implement, respectively. Further, in certain configurations the DC-DC converter can operate even if there is no communication, low-bandwidth communication, or intermittent communication, between the primary and the secondary controller(s) because the voltage sensors or phase sensors are available to provide the observed reference phase at each secondary controller. Accordingly, each respective secondary controller can locally derive the target phase offset with respect to the observed reference phase for control of its secondary converter to meet demanded or commanded load, within applicable technical constraints.

The DC-DC converter system is well suited for providing one or more DC voltage outputs (e.g., typically in the Class A voltage range) for a towed implement from one or more alternating current voltage terminals (e.g., primary AC output node 67) at a different voltage available (Class B voltage available) on the vehicle. The DC-DC converter system facilitates export of the available AC voltage on the vehicle to be made available at a different DC voltage level on the implement, or for conversion between different DC voltage levels (e.g., between Class A DC and Class B DC) on the vehicle and the implement.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. A system for controlling a direct-current-to-direct-current converter comprising:
   a primary converter, the primary converter having primary semiconductor switches;
   a primary controller providing control signals to the primary semiconductor switches;
   a plurality of secondary converters comprising a first secondary converter and a second secondary converter, the first and second secondary converters coupled in parallel to the primary converter via a set of conductors, each of the first and second secondary converters having secondary semiconductor switches;
   a plurality of transformers, each one of the first and second secondary converters associated with a corresponding one of the transformers, each of the transformers comprising a primary winding associated with a primary alternating current signal of the primary converter and a secondary winding associated with a secondary alternating current signal of a corresponding one of the first and second secondary converters;
   a plurality of primary sensors, at least one of the primary sensors associated with a corresponding one of the first and second secondary converters, each of the primary sensors configured for measuring or detecting a respective observed reference phase of the corresponding primary alternating current signal transmitted to each one of the first and second secondary converters, each of the primary sensors coupled via an inductance to the corresponding one of the transformers associated with its respective one of the first and second secondary converters; and
   a plurality of secondary controllers comprising a first secondary controller and a second secondary controller, the first and second secondary controllers providing secondary control signals to the respective secondary semiconductor switches of the first and second secondary converters with time-synchronized, target phase offsets with respect to the observed reference phase of the primary alternating current signals, to provide the target phase offsets commensurate with or sufficient to support a required electrical energy transfer between the primary controller and at least one of the first and second secondary controllers;
   the first secondary controller providing first secondary control signals for a first phase, a second phase and a third phase of first secondary semiconductor switches of the first secondary converter with time-synchronized, target phase offsets with respect to the respective observed reference phase of the first phase, the second phase or the third phase of the primary alternating current signal;

the second secondary controller providing second secondary control signals for a first phase, a second phase and a third phase of second secondary semiconductor switches of the second secondary converter with time-synchronized, target phase offsets with respect to the respective observed reference phase of the first phase, the second phase or the third phase of the primary alternating current signal;

wherein a bi-directional power transfer is supported between the primary converter and each of the first and second secondary converters; and wherein:

a vehicle energy system providing electrical energy to a primary direct current bus of the primary converter, wherein the vehicle energy system comprises:

a generator; and an internal combustion engine for providing rotational energy to the generator.

2. The system according to claim 1 wherein the inductance comprises a discrete inductance coupled to the primary winding of the corresponding transformer.

3. The system according to claim 1 wherein the inductance comprises a leakage or integral inductance of the primary winding of the corresponding transformer.

4. The system according to claim 1 wherein the bi-directional power transfer is supported between the primary converter and each of the first and second secondary converters;

a load coupled to a corresponding one of the first and second secondary converters, wherein the load is capable of operating in a power generation mode and wherein the load comprises:

an implement inverter; and an electric machine converting rotational energy to electrical energy inputted to the implement inverter for application to a secondary DC bus.

5. The system according to claim 1 wherein there is no communication of data messages or electrical signals between the primary controller and the first and second secondary controllers, where absence of the communication of data messages is supported by the observed reference phase measured by the primary sensor or the primary sensors associated with each respective first and second secondary converters to facilitate synchronization at each respective first and second secondary converters.

6. The system according to claim 5 wherein each of the primary sensors comprise a voltage sensor or a phase sensor associated with each phase of each first and second secondary converters.

7. The system according to claim 1 wherein each one of the first and second secondary controllers sets a phase offset value with respect to the observed reference phase of its respective primary sensor and a unique demanded load of the corresponding one of the first and second secondary converters associated with said one of the first and second secondary controllers.

8. The system according to claim 1 wherein each of the first and second secondary controllers is configured to estimate demanded load at its corresponding one of the first and second secondary converters and to communicate the estimated demanded load to at least one of the first and second secondary controllers over a communications line or wireless network.

9. The system according to claim 1 wherein each of the first and second secondary controllers is configured to estimate demanded load at its corresponding one of the first and second secondary converters and to communicate the estimated demanded load to the primary controller over a communications line or wireless network.

10. The system according to claim 9 wherein the primary controller is configured to estimate total aggregate demanded load at the primary converter and communicate the total aggregate demanded load with at least one of the first and second secondary controllers over the communication line or the wireless network.

11. The system according to claim 1 wherein one of the first and second secondary converters regulates voltage of respective different secondary direct current (DC) output voltages associated with second DC bus voltages that are independent of a primary DC bus voltage.

12. The system according to claim 1 further comprising a distributed system where the primary converter on vehicle is spaced apart from each of the first and second secondary converters on an implement, where each of a plurality of secondary AC inputs is synchronized with primary AC outputs of the primary converter by the primary sensors that measure the observed reference phase associated with primary terminals or secondary terminals of the corresponding transformer.

13. The system according to claim 1 wherein there is limited communications of data messages or electrical signals between the primary controller and the first and second secondary controllers to facilitate synchronization at each respective first and second secondary converters.

14. A system for controlling a direct-current-to-direct-current converter comprising:

a primary converter, the primary converter having primary semiconductor switches;

a primary controller providing control signals to the primary semiconductor switches;

a plurality of secondary converters comprising a first secondary converter and a second secondary converter, the first and second secondary converters coupled in parallel to the primary converter via a set of conductors, each of the first and second secondary converters having secondary semiconductor switches;

a plurality of transformers, each one of the first and second secondary converters associated with a corresponding one of the transformers, each of the transformers comprising a primary winding associated with a primary alternating current signal of the primary converter and a secondary winding associated with a secondary alternating current signal of a corresponding one of the first and second secondary converters;

a plurality of secondary sensors, at least one of the secondary sensors associated with a corresponding one of the first and second secondary converters, each of the secondary sensors configured for measuring or detecting a respective observed reference phase of the corresponding secondary alternating current signal transmitted to each one of the first and second secondary converters, each of the secondary sensors coupled via an inductance to the corresponding one of the transformers associated with its respective one of the first and second secondary converters; and a plurality of secondary controllers comprising a first secondary controller and a second secondary controller, the first and second secondary controllers providing secondary control signals to the respective secondary semiconductor switches of the first and second secondary converters with time-synchronized, target phase offsets with respect to the observed reference phase of the secondary alternating current signals, to provide the target phase offsets commensurate with or sufficient to support a required electrical energy transfer between the primary controller and at least one of the first and second secondary controllers;

the first secondary controller providing first secondary control signals for a first phase, a second phase and a third phase of first secondary semiconductor switches of the first secondary converter with time-synchronized, target phase offsets with respect to the respective observed reference phase of the first phase, the second phase or the third phase of the secondary alternating current signal;

the second secondary controller providing second secondary control signals for a first phase, a second phase and a third phase of second secondary semiconductor switches of the second secondary converter with time-synchronized, target phase offsets with respect to the respective observed reference phase of the first phase, the second phase or the third phase of the secondary alternating current signal;

wherein a bi-directional power transfer is supported between the primary converter and each of the first and second secondary converters; and wherein:

a vehicle energy system providing electrical energy to a primary direct current bus of the primary converter, wherein the vehicle energy system comprises:

a generator; and an internal combustion engine for providing rotational energy to the generator.

15. The system according to claim 14 wherein the inductance comprises a discrete inductance coupled to the secondary winding of the corresponding transformer.

16. The system according to claim 14 wherein the inductance comprises a leakage or integral inductance of the secondary winding of the respective transformer.

17. The system according to claim 14 wherein there is no communication of data messages or electrical signals between the primary controller and the first and second secondary controllers, where absence of the communication of data messages is supported by the observed reference phase measured by the secondary sensor or the secondary sensors associated with each respective first and second secondary converters to facilitate synchronization at each respective first and second secondary converters.

18. The system according to claim 17 wherein each of the secondary sensors comprise a voltage sensor or a phase sensor associated with each phase of each first and second secondary converters.

19. The system according to claim 14 wherein each one of the first and second secondary controllers sets a phase offset value with respect to the observed reference phase of its respective secondary sensor and a unique demanded load of the corresponding one of the first and second secondary converters associated with said one of the first and second secondary controllers.

20. The system according to claim 14 wherein each of the first and second secondary controllers is configured to estimate demanded load at its corresponding one of the first and second secondary converters and to communicate the estimated demanded load to at least one of the first and second secondary controllers over a communications line or wireless network.

21. A system for controlling a direct-current-to-direct-current converter comprising:

a primary converter, the primary converter having primary semiconductor switches;

a primary controller providing control signals to the primary semiconductor switches;

a plurality of secondary converters comprising a first secondary converter and a second secondary converter, the first and second secondary converters coupled in parallel to the primary converter via a set of conductors, each of the first and second secondary converters having secondary semiconductor switches;

a plurality of transformers, each one of the first and second secondary converters associated with a corresponding one of the transformers, each of the transformers comprising a primary winding associated with a primary alternating current signal of the primary converter and a secondary winding associated with a secondary alternating current signal of a corresponding one of the first and second secondary converters;

a plurality of primary sensors, at least one of the primary sensors associated with a corresponding one of the first and second secondary converters, each of the primary sensors configured for measuring or detecting a respective observed reference phase of the corresponding primary alternating current signal transmitted to each one of the first and second secondary converters, each of the primary sensors coupled via an inductance to the corresponding one of the transformers associated with its respective one of the first and second secondary converters; and a plurality of secondary controllers comprising a first secondary controller and a second secondary controller, the first and second secondary controllers providing secondary control signals to the respective secondary semiconductor switches of the first and second secondary converters with time-synchronized, target phase offsets with respect to the observed reference phase of the primary alternating current signals, to provide the target phase offsets commensurate with or sufficient to support a required electrical energy transfer between the primary controller and at least one of the first and second secondary controllers;

the first secondary controller providing first secondary control signals for a first phase, a second phase and a third phase of first secondary semiconductor switches of the first secondary converter with time-synchronized, target phase offsets with respect to the respective observed reference phase of the first phase, the second phase or the third phase of the primary alternating current signal;

the second secondary controller providing second secondary control signals for a first phase, a second phase and a third phase of second secondary semiconductor switches of the second secondary converter with time-synchronized, target phase offsets with respect to the respective observed reference phase of the first phase, the second phase or the third phase of the primary alternating current signal;

wherein a bi-directional power transfer is supported between the primary converter and each of the first and second secondary converters; and wherein:

a load coupled to a corresponding one of the first and second secondary converters, wherein the load is capable of operating in a power generation mode and wherein the load comprises:

an implement inverter; and an electric machine converting rotational energy to electrical energy inputted to the implement inverter for application to a secondary DC bus.

\* \* \* \* \*